(12) United States Patent
Baird

(10) Patent No.: US 12,405,126 B1
(45) Date of Patent: Sep. 2, 2025

(54) POSITION AND MAPPING MANAGEMENT SYSTEM

(71) Applicant: Amazon Technologies, Inc., Seattle, WA (US)

(72) Inventor: Alan Baird, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 18/064,493

(22) Filed: Dec. 12, 2022

(51) Int. Cl.
| | |
|---|---|
| *G01C 21/36* | (2006.01) |
| *G01C 21/34* | (2006.01) |
| *G06F 3/0484* | (2022.01) |
| *G06F 3/0488* | (2022.01) |
| *G06Q 10/083* | (2024.01) |

(52) U.S. Cl.
CPC ..... *G01C 21/3617* (2013.01); *G01C 21/3476* (2013.01); *G06Q 10/083* (2013.01); *G06F 3/0484* (2013.01); *G06F 3/0488* (2013.01)

(58) Field of Classification Search
CPC ............ G01C 21/3617; G01C 21/3476; G06Q 10/083; G06F 3/0484; G06F 3/0488
USPC ......................................................... 701/420
See application file for complete search history.

(56) References Cited

U.S. PATENT DOCUMENTS

| | | | | |
|---|---|---|---|---|
| 10,248,120 | B1 * | 4/2019 | Siegel | G05D 1/0223 |
| 10,308,430 | B1 * | 6/2019 | Brady | G06Q 10/083 |
| 10,514,690 | B1 * | 12/2019 | Siegel | G05D 1/0027 |
| 10,627,244 | B1 | 4/2020 | Lauka et al. | |
| 11,151,509 | B1 | 10/2021 | Mishra | |
| 11,222,299 | B1 * | 1/2022 | Baalke | G01C 21/3691 |
| 11,514,393 | B1 * | 11/2022 | Alonso Lopez | G06V 20/17 |
| 11,900,747 | B2 * | 2/2024 | Skaaksrud | G08G 1/202 |
| 2014/0180914 | A1 * | 6/2014 | Abhyanker | G06Q 10/0832 |
| | | | | 705/332 |

(Continued)

FOREIGN PATENT DOCUMENTS

| | | | | |
|---|---|---|---|---|
| JP | 2020506137 | A | * | 2/2020 |
| KR | 20250024836 | A | * | 6/2022 |
| WO | WO-2021137925 | A1 | * | 7/2021 ............. B60P 3/007 |

OTHER PUBLICATIONS

Yuen, Kum Fai et al. "Consumer Acceptance of Autonomous Delivery Robots for Last-Mile Delivery: Technological and Health Perspectives." Frontiers in psychology 13 (2022): n. pag. Web. (Year: 2022).*

(Continued)

*Primary Examiner* — Peter D Nolan
*Assistant Examiner* — Keith A von Volkenburg
(74) *Attorney, Agent, or Firm* — Eversheds Sutherland (US) LLP

(57) ABSTRACT

Technologies are disclosed for position and mapping management to collect information from users for delivering items to locations associated with the users. The position and mapping management can include identifying a user profile being eligible for customized path delivery, receiving, from a user device, a customized position response including a confirmed position selection associated with a customized position, and receiving, from the user device, a customized path response including a confirmed path selection associated with a customized path. The customized position and the customized path can be validated and utilized for automated item delivery and/or partially automated item delivery.

20 Claims, 7 Drawing Sheets

(56) References Cited

U.S. PATENT DOCUMENTS

| | | | |
|---|---|---|---|
| 2015/0202770 A1* | 7/2015 | Patron | G06Q 50/01 901/50 |
| 2020/0183414 A1* | 6/2020 | Shih | G06Q 10/0832 |
| 2020/0225673 A1* | 7/2020 | Ebrahimi Afrouzi | A47L 11/4011 |
| 2021/0089040 A1* | 3/2021 | Ebrahimi Afrouzi | G05D 1/0248 |
| 2021/0209543 A1* | 7/2021 | Scott | G06Q 10/083 |
| 2021/0300297 A1* | 9/2021 | Kursar | B60R 25/23 |
| 2021/0308860 A1* | 10/2021 | Skaaksrud | G16H 40/20 |
| 2021/0403024 A1* | 12/2021 | Shih | G06Q 10/0833 |
| 2022/0012688 A1* | 1/2022 | Rakshit | G01C 21/3438 |
| 2022/0066456 A1* | 3/2022 | Ebrahimi Afrouzi | G06F 3/04883 |
| 2022/0261601 A1* | 8/2022 | Amato | G06F 18/214 |
| 2023/0410028 A1* | 12/2023 | O'Toole | G06Q 10/0832 |

OTHER PUBLICATIONS

"Cost-optimal Truck-and-robot Routing for Last-mile Delivery." Networks n. pag. Web. 2021 (Year: 2021).*

U.S. Appl. No. 17/031,682, filed Sep. 24, 2020, Wang, et al., "Location-Based Package Drop-Off Instructions", 48 pages.

U.S. Appl. No. 17/089,269, filed Nov. 4, 2020, Wang, et al., "Artificial Intelligence (AI) Models to Improve Image Processing Related to Pre and Post Item Deliveries", 40 pgs.

U.S. Appl. No. 17/208,944, filed Mar. 22, 2021, Zeng, et al., "Location-Based Package Visual Delivery Instructions", 51 pages.

* cited by examiner

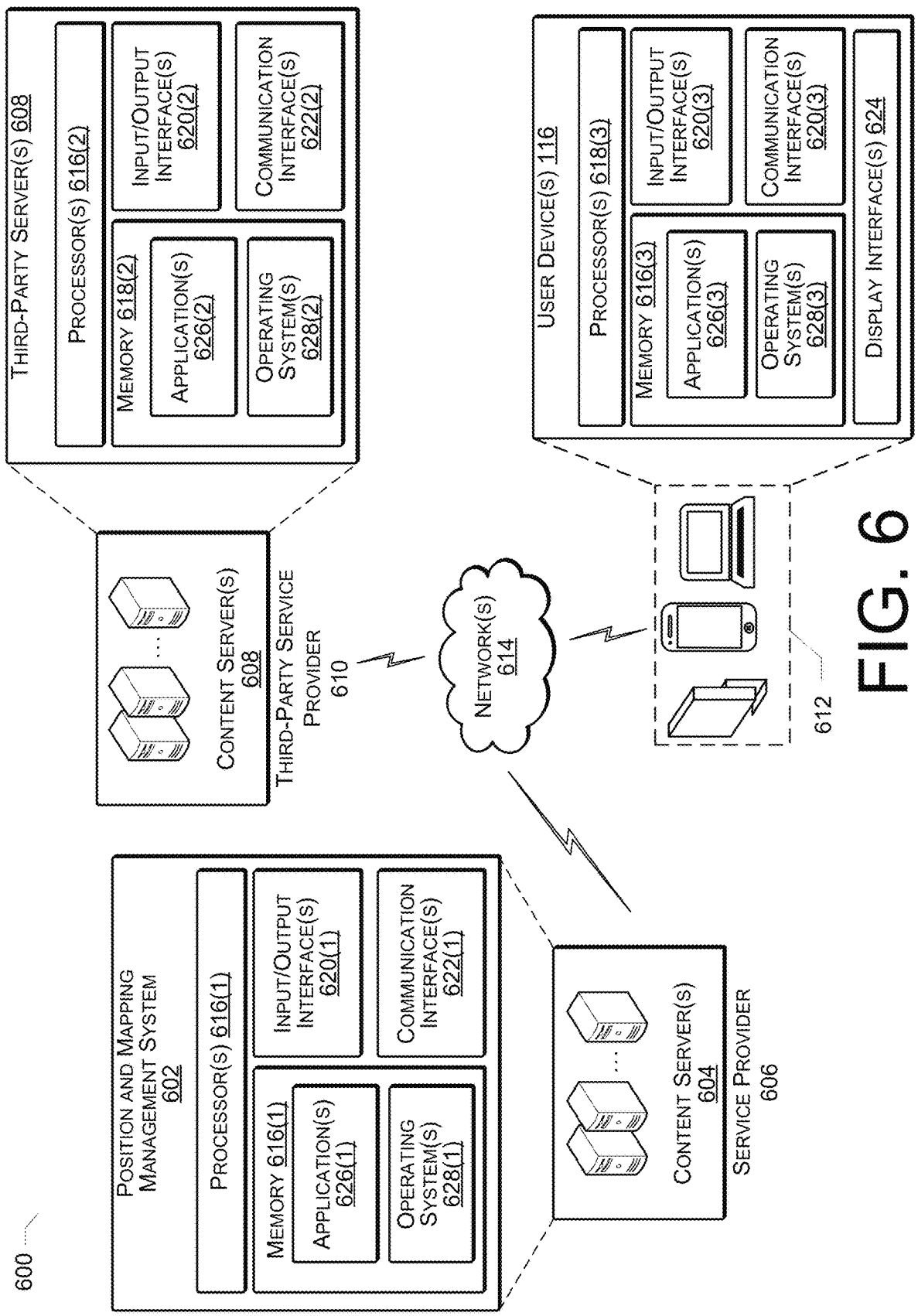

POSITION AND MAPPING MANAGEMENT SYSTEM

BACKGROUND

Various types of information may be utilized for item deliveries performed by autonomous vehicles and/or semi-autonomous vehicles. For example, the information utilized for the item deliveries may include information associated with distribution centers, information associated with delivery locations, information associated with geographic areas that include the distribution centers and/or the delivery locations, information associated with geographic areas between the distribution centers and the delivery locations, information associated with autonomous and/or semiautonomous courier vehicles, and so on. Item delivery information, which may include item pickup information, item transport information, and/or item drop off information, may be identified based on input from various types of computing devices associated with various types of users. For example, the item delivery information may include information based on input received from computing devices associated with service providers, distribution centers, mapping services, courier services, customers, third parties, autonomous and/or semiautonomous vehicles, and so on.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 6 is a block diagram of an illustrative computing architecture 600 of one or more computing devices shown in FIG. 1.

DETAILED DESCRIPTION

Figure 1:
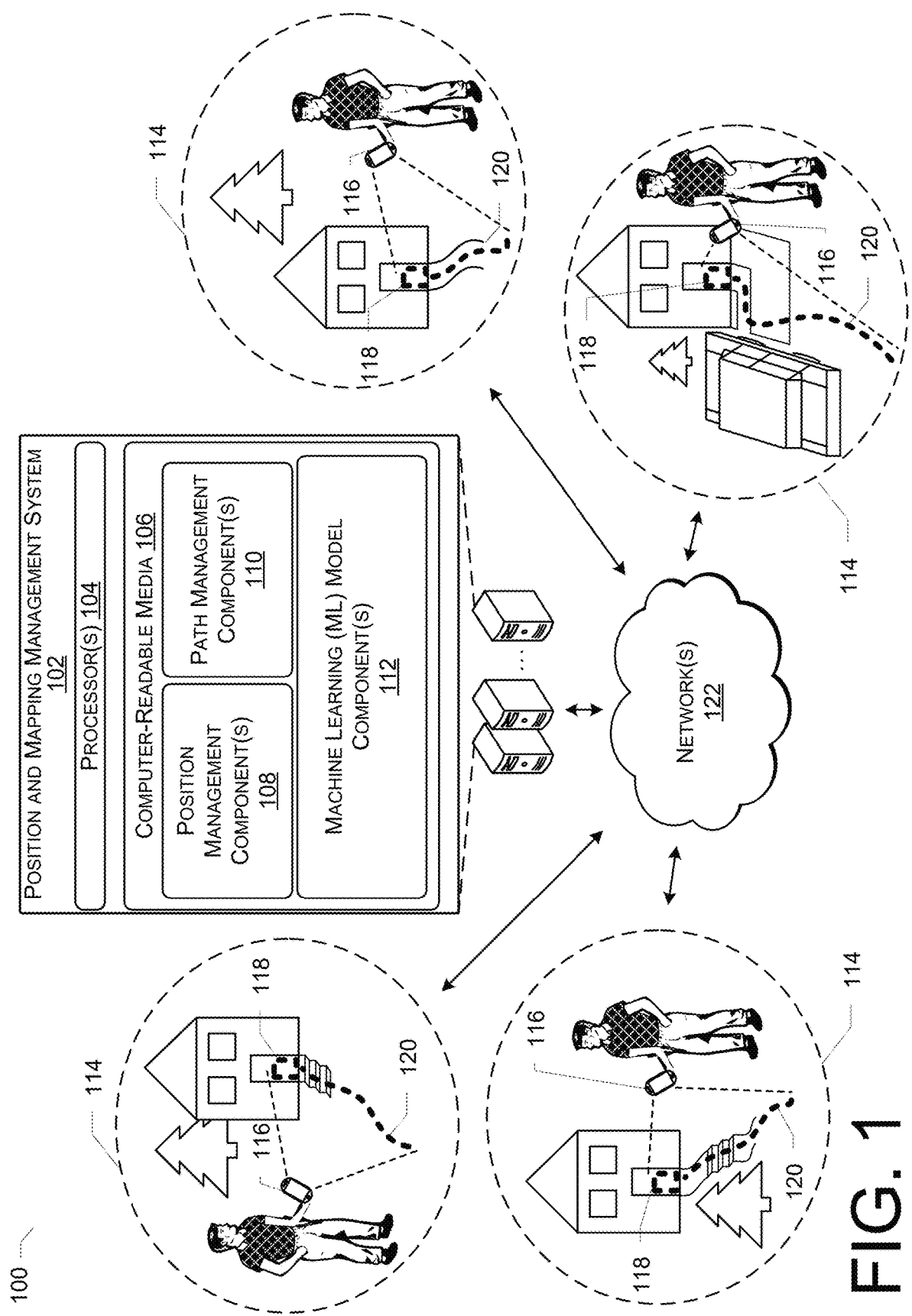
FIG. 1 illustrates a system-architecture diagram of an example environment in which a position and mapping management system is utilized for sensor data generation and item delivery information identification.

This disclosure is directed to techniques for utilizing position and mapping management to collect information from users for delivering items to locations associated with the users. For example, user devices can be utilized to generate user device data and to identify user information, which can be utilized for item deliveries, such as automated item deliveries, partially automated item deliveries, etc. The user device data and the user information can be utilized to identify position information and path information for the item deliveries. The position information can indicate positions at which the items are to be delivered. The path information can indicate paths by which autonomous vehicles and/or semiautonomous vehicles can travel to deliver the items at the identified positions. Delivery management information can include item delivery information, which can include the position information and/or the path information utilized for the item deliveries. The item delivery information can be identified based on the user device data, which can include sensor data. Various types of sensors, such as lidar sensors, camera sensors, etc., can be utilized to generate various types of sensor data, such as lidar data, visual data (e.g., photographs, videos, etc.), etc.

The delivery management information and/or the item delivery information can be identified based on the users and/or user information, which can include various types of information, such as user profile information, associated with the users. The delivery management information can be utilized to identify to transmit requests to users for the user information. The delivery management information can identify to transmit the requests based on delivery eligibility information associated with the users and/or user locations for item deliveries. The delivery eligibility information, which can include information indicating eligibility for the automated item deliveries and/or the partially automated item deliveries, can be identified based on various types of information, such as user locations, user order histories, and/or any of one or more other types of item delivery information. The user information, which can be received via responses from the user devices based on the requests, can be utilized to identify the position information and/or the path information.

The position information can be identified based on the sensor data being generated by the user devices to identify the positions to which items can be delivered. The user devices can be controlled to generate the sensor data, which can include portions of the sensor data associated with portions of premises, such as user premises, associated with the users and/or the user locations. The user devices can be utilized to identify customized position selections received via user input to the user devices. The position information can be identified based on the sensor data, the portion of the sensor data, the customized position selections, and/or a combination thereof.

The path information can be identified based on the sensor data being generated by the user devices to identify the paths by which items can be delivered. The user devices can be controlled to generate the sensor data, which can include portions of the sensor data associated with portions of the premises, such as the user premises. The user devices can be utilized to identify customized path selections received via user input to the user devices. The path information can be identified based on the sensor data, the portion of the sensor data, the customized path selections, and/or a combination thereof.

The item delivery information can include the position information, the path information, validation information, confirmation information, and/or a combination thereof. The validation information can be identified to indicate whether the position information and/or the path information preliminarily qualifies and/or qualifies (e.g., fully qualifies) for item deliveries. The confirmation information can be identified to indicate the users confirming the position information and/or the path information.

The item deliveries, including the automated item deliveries and/or the partially automated deliveries, can be performed based on the delivery management information and/or the item delivery information. The delivery management information can include status information associated with the users. The status information can indicate whether the user profiles are deemed active or inactive for the item deliveries. The automated item deliveries can be performed based on the user profiles being deemed active. The automated item deliveries can be performed further based on the vehicles attending the items at the identified positions, and on the users retrieving the items from the vehicles attending the items. The partially automated item deliveries can be performed further based on the vehicles delivering the items at the identified positions, and on the users retrieving the items having been previously delivered by the vehicles.

In addition to the aforementioned benefits, computing resources, such as processing resources, memory resources, networking resources, power resources, and the like, may also be conserved by aspects of the techniques and systems described herein. For example, aspects of the techniques and systems described herein conserve memory resources. That is, with the sensor data being generated by the user devices and utilized to identify delivery management information, the delivery management information can be efficiently and accurately identified. Multiple attempts at identifying delivery management information which are often required according to existing systems ineffectively and/or inaccurately identifying delivery management information may be avoided. The sensor data generated by the user devices according to the techniques discussed herein can be utilized to identify the delivery management information with greater levels of precision and accuracy in comparison to item delivery information identified utilizing techniques according to conventional technology.

The amounts of information being stored in memory resources of the computing devices of systems implemented according to the techniques as discussed herein may be decreased due to the sensor data being generated, and the delivery management information being identified, with greater levels of accuracy in contrast to the sensor data generated and the delivery management information identified by existing systems. Larger amounts of sensor data being generated, and delivery management information being identified, may be required according to existing systems to compensate for the sensor data and the item delivery information being less accurate, less detailed, and less precise.

For instance, delivery management information identified utilizing techniques according to conventional technology may be ineffectively and inaccurately identified based on sensor data generated by devices separated from the delivery locations by large distances. In another instance, delivery management information identified utilizing techniques according to conventional technology may be incorrectly identified based on sensor data generated by devices operated by users (e.g., potential customers and/or customers) that are unfamiliar with the delivery locations and/or unfamiliar with preferences of the users associated with the delivery locations. The techniques according to conventional technology may require multiple repetitions to generate sensor data and identify delivery management information, which may be avoided with the relatively more precise and more accurate sensor data generating according to the techniques as discussed herein. Amounts of messages required to be communicated in order to modify and replace insufficient, inaccurate, or incorrect sensor data being generated, and/or delivery management information being identified, with existing systems may be avoided, thereby decreasing amounts of networking resources being utilized by computing devices implemented according to techniques discussed herein. By decreasing amounts of networking resources being utilized by utilizing computing devices implemented according to techniques discussed herein, network throughput, connectivity, and bandwidth can be increased, and network latency and packet loss rate can be decreased.

According to techniques discussed herein, in some examples, users can request, obtain, and/or retain control over what data is transmitted to the service provider devices (e.g., servers) and/or third-party devices (e.g., servers) to enable automated delivery features. As a result, the data being processed and/or stored by the user devices, the service provider servers, and/or the third-party devices, is customized, more succinct, and/or of a smaller size, in contrast to the data being processed and/or stored for deliveries according to existing technology. Resources utilized according to techniques discussed herein can be conserved in comparison to existing technological resources, which require more extensive processing to perform the mapping for deliveries.

Moreover, computing resources, such as processing resources, memory resources, networking resources, power resources, and the like, of vehicles, including autonomous or semiautonomous vehicles, for item delivery may be improved according to the techniques discussed herein as compared to existing approaches. The vehicles being controlled more effectively, accurately, and efficiently may conserve power and utilize fewer processing resources in comparison to vehicles being controlled with techniques according to conventional technology. By utilizing the techniques as discussed herein, the amounts of information being stored in memory resources of the vehicles may be decreased due to sensor data being generated by the user's devices with greater levels of accuracy in contrast to the sensor data generated utilizing existing systems. The vehicles being implemented according to the techniques as discussed herein may require fewer networking resources for performing item deliveries, since the delivery management information utilized by the vehicles for navigation may be more accurate than with conventional systems.

Also described herein are systems and devices comprising one or more processors and one or more memories, as well as non-transitory computer-readable media storing computer-executable instructions that, when executed by the one or more processors, cause performance of various acts and/or processes disclosed herein. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a position and mapping management system 102 is utilized for sensor data generation and delivery management information identification. The position and mapping management system 102 can manage the sensor data generation and the delivery management information identification utilized to perform item deliveries for users.

The position and mapping management system 102 can include one or more processors 104 and computer-readable media 106. The computer-readable media 106 can be utilized to store one or more position management components 108, one or more path management components 110, and one or more machine learning (ML) model components 112. The position and mapping management system 102 can be utilized to manage one or more item deliveries, such as one or more potential item deliveries (e.g., item delivery(ies) not currently existing, planned, etc.), one or more planned item deliveries, one or more current item deliveries, any other types of item deliveries, or any combination thereof, to one or more areas.

The position management component(s) can be utilized to manage identifying and/or generating the customized position(s) 118, and/or any of various types of information utilized for the identifying and/or the generating of the customized position(s) 118, as discussed throughout this disclosure. The path management component(s) 110 can be utilized to manage identifying and/or generating the customized path(s) 120, and/or any of various types of information utilized for the identifying and/or the generating of the customized path(s) 120, as discussed throughout this disclosure.

In some examples, the area(s) can include one or more premises (e.g., user premise(s)) 114. The position and mapping management system 102 can be utilized to communicate with one or more computing devices (e.g., user device(s)) 116, to manage the item delivery(ies). The item delivery(ies) for delivering the item(s) can be performed utilizing one or more customized positions 118, one or more customized paths 120, or a combination thereof. The position and mapping management system 102 can communicate with the user device(s) 116, via one or more networks 122.

In some examples, any one or more of the user device(s) 116 can be a computing device, such as a mobile device (e.g., a cellular phone). However, the current disclosure is not limited as such, and any of one or more of the user device(s) 116 can be any type of computing device, such as any type of handheld device, a wearable device, and so on.

The position and mapping management system 102 can exchange one or more communications with the user device(s) 116 via the network(s) 122 to manage the delivery management information. In some examples, delivery management information can include various types of information, including item delivery information, user information, service provider information, third-party information, one or more of other various types of information, or any combination thereof. In those or other examples, the delivery management information can include validation information, confirmation information, status information, and/or any other type of information identified based on one or more portions (e.g., the item delivery information, the user information, the service provider information, the third-party information, the one or more of the other various types of information, or any combination thereof) of the delivery management information.

In some examples, the network(s) 122 may include one or more of various type of networks (e.g., the Internet, wireless wide area networks (WANs), personal area networks (PANs), wired and/or wireless local area networks (LANs), etc.). The network(s) 122 may include any type of network or combination of networks, including wired and/or wireless networks. In some embodiments, the user device(s) 116 can access one or more network-based services of the position and mapping management system 102, such as, without limitation, via an application (e.g., a computing device application) (e.g., a mobile device application), a web-based console, a software-development kit (SDK), a command-line interface (CLI), an application programming interface (API), and/or any other suitable means.

The item delivery information can include various types of information associated with the item delivery(ies). In some examples, the item delivery information can include customized position information, customized path information, one or more other types of information associated with the item delivery(ies) and being determined based on the sensor data, or any combination thereof. In those or other examples, the customized position information can include and/or identify one or more of the customized position(s) 118 associated with the item delivery(ies).

In some examples, the customized position information can be identified based on sensor data generated by utilizing one or more sensors of the user device(s) 116. The sensor(s) can include one or more of various types of sensors, including one or more camera sensors, one or more lidar sensors, and so on, or any combination thereof. The sensor data can include one or more types of data, including camera data generated by utilizing the camera sensor(s), lidar data generated by utilizing the lidar sensor(s), and so on, or any combination thereof.

In some examples, the sensor data can be generated by the user device(s) 116 being controlled by one or more users. The sensor data can be generated by the user device(s) 116 being utilized to capture light associated with a surrounding environment. In some examples, the camera sensor(s) can receive light utilized to generate camera data. In those or other examples, the camera data can include image data (e.g., one or more images), video data (e.g., one or more videos), and so on, or any combination thereof, representing one or more portions of the environment. The camera data can include one or more pixels representing portions of the environment.

In some examples, the lidar sensor(s) can may be configured to include one or more light emitters and one or more light sensors, with the light emitter(s) including one or more lasers that direct highly focused light toward one or more objects or one or more surfaces, which reflect the light back to the light sensor(s), though any other light emission and detection to determine one or more ranges (e.g., flash lidar, mems lidar, solid state lidar, and the like). One or more measurements of the lidar sensor(s) may be represented as three-dimensional lidar data having one or more coordinates (e.g., Cartesian, polar, etc.) corresponding to one or more positions or one or more distances captured by the lidar sensor(s). For example, the three-dimensional lidar data may include one or more three-dimensional maps or one or more point clouds, which may be represented as one or more vectors emanating from one or more light emitters and terminating at one or more objects or one or more surfaces. In some examples, converting operations may be used to convert the three-dimensional lidar data to multichannel two-dimensional data.

In some examples, one or more portions of data (e.g., the camera data, the lidar data, etc., or any combination thereof) in the sensor data can be fused to generate data identifying a more complete or accurate representation of the environment. In those or other examples, the camera data, which can include the pixel(s), can be fused with the lidar data (e.g., the point cloud(s)), one or more of data of various types, such as one or more portions (e.g., one or more global positioning system (GPS) coordinates, one or more latitudinal and/or longitudinal coordinates, one or more elevations above ground, one or more altitudes, etc.) of sensor data, or any combination thereof. In some examples, one or more sensor data of any type (e.g., the camera data, the lidar data, any of the sensor data being fused, as discussed herein) can be utilized to identify the customized position information, the customized path information, and/or one or more other types of information utilized for the item delivery(ies).

In some examples, identifying the customized position(s) 118 and the customized path(s) 120 can include performing segmentation and/or classification on captured sensor data to identify types of objects associated with the environment. For example, the position and mapping management system 102 can perform segmentation to determine that a portion of the captured data corresponds to an object and perform classification on the segmented data to determine a type of the object.

In some examples, object recognition can be performed by segmenting the sensor data and classifying individual ones of at least one object as a permanent object, a semi-permanent object, a temporary object, and so on, based on the environment being labeled. The classification can be utilized by the vehicle(s) for the item delivery(ies). The item delivery(ies) can be performed by the vehicle(s) utilizing the classification(s) to localize individual positions of the vehicle(s). For example, at least one type of object can be utilized for localization, while disregarding at least one other type of object. The object(s) utilized for the localization can include individual ones of the permanent object(s) (e.g., drive-ways, path-ways, steps, columns, doors, windows, mailboxes, etc.) as a reference point, while disregarding, for example, the semipermanent object(s) (e.g., landscaping vegetation, etc.) and/or the temporary object(s) (e.g., parked car, hose, bicycle, potted plant, etc.).

In some examples, the customized position information can include and/or identify information associated with the customized position(s), the information associated with the customized position(s) including location information (e.g., one or more locations (e.g., one or more GPS coordinates, one or more latitudinal and/or longitudinal coordinates, one or more addresses, one or more elevations above ground, one or more altitudes above sea level, etc., and/or information associated with one or more of the GPS coordinate(s), the latitudinal and/or longitudinal coordinate(s), the address(es), the elevation(s), the altitude(s), etc.)). In those or other examples, the information associated with the customized position(s) can include outline information (e.g., one or more outlines, and/or information associated with the outline(s)), marker information (e.g., one or more markers, and/or information associated with the marker(s)), tag information (e.g., one or more tags, and/or information associated with the tag(s)), etc. associated with the customized position(s) 118 and possibly utilized for the item delivery(ies), or any combination thereof.

The outline(s) associated with the customized position(s) 118 can include, for example, one or more virtual representations of one or more of outline(s) associated with the customized position(s) 118 for the item delivery(ies). The outline(s) associated with the customized position(s) 118 can include one or more outlines of any of one or more shapes (e.g., one or more cubes, one or more spheres, one or more random predetermined, and/or customized shapes, etc.) associated with one or more of various sizes and dimensions of one or more of the item(s) associated with the item delivery(ies). The marker(s) associated with the customized position(s) 118 can include, for example, one or more virtual representations (or "representative image(s)") of one or more of the marker(s) (e.g., marker(s) representing one or more points in space, such as point(s) at one or more corners, edges, etc. at which the item(s) will be positioned, etc.) associated with the customized positions 118 for the item delivery(ies). The tag(s) associated with the customized position(s) 118 can include, for example, one or more virtual representations of one or more of the tag(s) (e.g., one or more identifiers (e.g., one or more GPS coordinates, one or more latitudinal and/or longitudinal coordinates, one or more addresses, one or more elevations above ground, one or more altitudes above sea level, etc.) representing one or more positions at which the item(s) will be delivered, etc.) associated with the customized positions 118 for the item delivery(ies).

The customized path information can include and/or identify one or more of the customized path(s) 120 associated with the item delivery(ies). In additional or alternative examples, the customized path information can include and/or identify information associated with the customized path(s) 120, the information associated with the customized path(s) including waypoint information (e.g., one or more waypoints), location information (e.g., one or more locations (e.g., one or more GPS coordinates, one or more latitudinal and/or longitudinal coordinates, one or more addresses, one or more elevations above ground, one or more altitudes above sea level, etc., and/or information associated with one or more of the GPS coordinate(s), the latitudinal and/or longitudinal coordinate(s), the address(es), the elevation(s), the altitude(s), etc.)), outline information (e.g., one or more outlines, and/or information associated with the outline(s)), marker information (e.g., one or more markers, and/or information associated with the marker(s)), tag information (e.g., one or more tags, and/or information associated with the tag(s)), etc. associated with the customized path(s) 120 and possibly utilized for the item delivery(ies), or any combination thereof.

The waypoint(s) associated with the customized path(s) 120 can, for example, be identified based on one or more waypoint selections received via user input to the user device(s) 116. The waypoint(s) can be identified by the waypoint selection(s) at and/or during generation of the sensor data, including generation of the image(s), the video(s), etc.

In some examples, the waypoint(s) can be identified based on one or more screen taps received via user input to the user device(s) 116. In those or other examples, user input to the user device(s) 116 can include one or more screen touches (e.g., one or more screen taps (or "tap(s)"), one or more screen drags (or "drag(s)"), etc.). In those or other examples, any of the screen tap(s) can be utilized to generate individual ones of the waypoint(s). In those or other examples, any of the drag(s) can be utilized to generate one or more of the waypoint(s). For example, with instances in which the user input includes a drag, one or more of the waypoint(s) can be generated at a point (e.g., an initial point) associated with the drag beginning, a next point (e.g., a point separated from the initial point by a distance equal to or greater than a threshold distance, a point identified at a current position of the drag based on a period of time from a time at which a previous point is identified being equal to or greater than a threshold time, a point associated with a position of the drag identifying an item and/or characteristic of the environment, etc.), another next point (e.g., a subsequent point identified in a similar way as the previous point), and so on.

In some examples, one or more of the waypoint(s) can be identified based on one or more points associated with one or more positions of the drag(s) identifying one or more items and/or one or more characteristics of the environment, such as by identifying one or more of the waypoint(s) at a portion of a sidewalk, a flat portion of terrain, a robust portion of a surface, a portion of a step in a stairway, a flat rock, and so on, or any combination thereof. In those or other examples, the waypoint(s) can be identified automatically by the user device(s) 116 and/or one or more other computing devices (e.g., the position and mapping management system 102), manually based on user input to the user device(s) 116, and so on, or any combination thereof.

In some examples, one or more portions of the item delivery information (e.g., one or more of the customized position(s) 118, one or more of the customized path(s) 120, one or more of the waypoint(s), or any combination thereof), can be identified automatically and utilized to output, by the user device(s) 116, an indication requesting confirmation from the user(s) of the one or more portions of the item delivery information (e.g., the one or more of the customized position(s) 118, the one or more of the customized path(s) 120, the one or more of the waypoint(s), or any combination thereof). In those or other examples, one or more portions of the item delivery information (e.g., one or more of the customized position(s) 118, one or more of the customized path(s) 120, one or more of the waypoint(s), or any combination thereof), can be identified (e.g., manually identified) based on user input and automatically analyzed to validate one or more portions of the item delivery information (e.g., the one or more of the customized position(s) 118, the one or more of the customized path(s) 120, the one or more of the waypoint(s), or any combination thereof).

The outline(s) associated with the customized path(s) 120 can include, for example, one or more virtual representations of one or more of outline(s) associated with the path(s) 120 for the item delivery(ies). The outline(s) associated with the path(s) 120 can include one or more outlines of any of one or more shapes (e.g., one or more lines, one or more tunnels, one or more shadows, one or more corridors, etc.) associated with one or more of the customized path(s) 120. The marker(s) associated with the customized position(s) 118 can include, for example, one or more virtual representations of one or more of the marker(s) (e.g., marker(s) representing one or more points in space, such as point(s) at one or more corners, edges, etc. at which the item(s) will be positioned, etc.) associated with the customized positions 118 for the item delivery(ies). The tag(s) associated with the customized position(s) 118 can include, for example, one or more virtual representations of one or more of the tag(s) (e.g., one or more identifiers (e.g., one or more GPS coordinates, one or more latitudinal and/or longitudinal coordinates, one or more addresses, one or more elevations above ground, one or more altitudes above sea level, etc.) representing one or more positions at which the item(s) will be delivered, etc.) associated with the customized positions 118 for the item delivery(ies).

In some examples, identifying of the item delivery information can include one or more portions of the item delivery information (the customized position information, the customized path information, etc., or any combination thereof) being generated automatically by the position and mapping management system 102, the user device(s) 116, and/or one or more other devices. In those or other examples, identifying of the item delivery information can include one or more portions of the item delivery information (the customized position information, the customized path information, etc., or any combination thereof) being generated (e.g., manually generated via one or more user selections) based on user input. The portion(s) of the item delivery information being generated automatically can include one or more portion(s) of the item delivery information being identified fully automatically or partially automatically (e.g., partially automatically and partially manually).

In some examples, identifying and/or generating of the customized position(s) 118 can be performed prior to identifying and/or generating of the customized path(s) 120. In those or other examples, the position and mapping management system 102, the user device(s) 116, and/or one or more other devices utilized to identify the customized position(s) 118 and the customized path(s) 120 can refrain from identifying and/or generating of the customized path(s) 120 until identifying and/or generating of the customized position(s) 118 is successfully performed. For example, with instances in which a customized position 118 (e.g., a customized position for a premises) and a customized path 120 (e.g., a customized path for the premises) is to be identified and/or generated for delivery to an area and/or location, the customized position 118 can be identified and/or generated, and the customized path 120 can be identified and/or generated based on the customized position 118 having been successful identified and/or generated.

Although identifying and/or generating of the customized position(s) 118 can be performed prior to identifying and/or generating of the customized path(s) 120, as discussed above in the current disclosure, it is not limited as such. In some examples, identifying and/or generating of a customized path 120 (e.g., a customized path for a premises) can be performed prior to identifying and/or generating of a customized position 118 (e.g., a customized position for the premises) in a similar way as discussed above for refraining from identifying and/or generating of the customized path(s) 120 until identifying and/or generating of the customized position(s) 118 is successfully performed. In those or other examples, identifying and/or generating of the customized path(s) 120 and/or the customized position(s) 118 can be performed separately and/or independently, such as with a customized path 120 (e.g., a customized path for a premises) and/or a customized position 118 (e.g., a customized position for the premises) being identified and/or generated without refraining from identifying and/or generating a remaining one of the customized path 120 and/or the customized position 118.

The validation information can include information associated with validation based on one or more portions of item delivery information (e.g., manually generated item delivery information and/or automatically generated item delivery information) (e.g., the customized position information, the customized path information) and/or the sensor data. The validation information can be identified by the user device(s) 116, the position and mapping management system 102, and/or one or more other computing devices.

In some examples, the validation information can be identified based on the customized position information, including the customized position(s) 118. The validation information can be identified based on the customized position(s) 118 based on one or more criteria (e.g., customized position criteria). The validation information can indicate whether the customized position criteria is satisfied based on one or more metrics (e.g., one or more customized position metrics) being within one or more metric thresholds (e.g., one or more customized position metric thresholds).

In those or other examples, the validation information can be utilized to identify whether one or more of the customized position criteria are satisfied based on one or more predicted user satisfaction levels utilized to identify a likelihood of the user(s) being satisfied with the customized position(s), one or more distances (or "drop off distance(s)") from one or more portions of the customized position(s) 118 to one or more other items in the environment utilized to identify whether there is sufficient space for placement of the delivery item(s), one or more spaces (e.g., one or more two-dimensional spaces and/or one or more three-dimensional spaces) being utilized to identify whether there is sufficient space for the delivery item(s), one or more distances (or "pickup distance(s)") from one or more portions of the customized position(s) 118 utilized to identify whether one or more distances between the portion(s) of the customized position(s) 118 and locations from which one or more users will travel to pick up the delivery item(s) is appropriate (e.g., less than one or more threshold distances), one or more robustness levels associated with one or more surfaces, one or more temperatures, one or more humidity levels, one or more sound levels, or any combination thereof.

In those or other examples, the validation information can be utilized to identify whether one or more of the customized position criteria are satisfied, such as by the predicted user satisfaction level(s) being equal to or greater than one or more predicted user satisfaction level thresholds, the drop off distance(s) being equal to or greater than one or more drop off distance thresholds, the space(s) (e.g., the two-dimensional space(s) and/or the three-dimensional space(s)) being equal to or greater than one or more space thresholds (e.g., one or more two-dimensional space thresholds and/or one or more three-dimensional space thresholds), the pickup distance(s) being equal to or less than one or more pickup distance thresholds, the robustness levels being equal to or greater than one or more robustness level thresholds, the temperature(s) being equal to or less than one or more temperature thresholds, the humidity levels being equal to or less than one or more humidity level thresholds, the sound levels being equal to or less than one or more sound thresholds, or any combination thereof.

In some examples, the validation information can be identified based on the customized path information, including the customized path(s) 120. The validation information can be identified based on the customized path(s) 120 based on one or more criteria (e.g., customized path criteria). The validation information can indicate whether the customized path criteria is satisfied based on one or more metrics (e.g., one or more customized path metrics) being within one or more metric thresholds (e.g., one or more customized path metric thresholds).

In those or other examples, the validation information can be utilized to identify whether one or more of the customized path criteria are satisfied based on one or more predicted user satisfaction levels utilized to identify a likelihood of the user(s) being satisfied with the customized path(s), one or more distances (or "mapping distance(s)") from one or more portions of the customized path(s) 120 utilized to identify whether there is sufficient space from the portion(s) of the customized path(s) 120 to one or more other items in the environment for delivering (or "transporting") the delivery item(s) (e.g., space for movement of the vehicle(s) and/or the item(s)), one or more spaces (e.g., one or more two-dimensional spaces or one or more three-dimensional spaces) being utilized to identify whether there is sufficient space for delivering the delivery item(s) (e.g., space for movement of the vehicle(s) and/or the item(s)), one or more robustness levels associated with one or more surfaces at, or over, which the vehicle(s) will traverse, one or more temperatures, one or more humidity levels, one or more sound levels, or any combination thereof. In those or other examples, the validation information can be utilized to identify whether one or more of the customized position criteria are satisfied, such as by the predicted user satisfaction level(s) being equal to or greater than one or more predicted user satisfaction level thresholds, the mapping distance(s) being equal to or greater than one or more mapping distance thresholds, the space(s) (e.g., the two-dimensional space(s) and/or the three-dimensional space(s)) being equal to or greater than one or more space thresholds (e.g., one or more two-dimensional space thresholds and/or one or more three-dimensional space thresholds), the pickup distance(s) being equal to or less than one or more pickup distance thresholds, the robustness levels being equal to or greater than one or more robustness level thresholds, the temperature(s) being equal to or less than one or more temperature thresholds, the humidity levels being equal to or less than one or more humidity level thresholds, the sound levels being equal to or less than one or more sound thresholds, or any combination thereof.

The confirmation information can include information indicating one or more confirmations being received or not received via user input to the user device(s) 116. By way of example, one or more of the confirmation(s) can be received or not received via user input based on one or more initial user assessments, one or more subsequent user assessments (e.g., one or more next user assessments), and so on, or any combination thereof, associated with one or more of any of the metric(s) and/or the criteria, based on the customized position(s) 118 and/or the customized path(s) 120. The confirmation information can be identified based on the item delivery information. The confirmation information can be identified based on one or more confirmation selections received via the user input to the user device(s) 116.

In some examples, one or more of the confirmation selection(s) can be received based on the sensor data being generated and/or the item delivery information being identified. In those or other examples, the confirmation selection(s) can be received based on the sensor data being generated, the item delivery information being identified, and/or one or more item delivery information indications (e.g., one or more dotted lines, one or more shadows, one or more highlights, one or more text descriptions, etc., or any combination thereof) associated with one or more portions of the item delivery information being displayed by the user device(s) 116 (e.g., the item delivery information indications being displayed for a period of time that is greater than or equal to a period of time threshold).

In additional or alternative examples, one or more of the confirmation selection(s) can be received based on one or more validation indications describing the validation information being displayed by the user device(s) 116. In those or other examples, the validation indication(s) can be displayed and utilized to inform the user(s) whether the item delivery information is successfully validated. The user(s) can utilize the user device(s) to modify one or more portions of the item delivery information, to generate additional sensor data, and/or to identify additional and/or modified item delivery information, based on the validation indication(s) identifying one or more portions of the item delivery information as not being successfully validated.

The user information can include one or more of various types of user information, including user profile information (e.g., one or more user profiles) and/or one or more of any other types of information associated with the users. For example, one or more of the user profile(s) can include one or more portions of the item delivery information, one or more delivery preferences, one or more user identifiers (e.g., one or more names, one or more user numbers, one or more account numbers, one or more profile numbers, one or more delivery addresses, credit card information, one or more billing addresses, etc.), and/or any other type of information identified based on user input and/or input from one or more other devices (e.g., the position and mapping management system 102).

The service provider information can include various types of information associated with one or more service providers, such as service provider distribution center information (or "distribution center information"). The distribution center information can include various types of information associated with one or more service provider distribution centers (or "distribution center(s)"), such as information associated with one or more locations, one or more inventories, one or more operating statuses, one or more delivery capability statuses, one or more distribution center vehicle types, one or more distribution center vehicle statuses, one or more other types of distribution center information, or any combination thereof. The distribution center location(s) can include one or more locations associated with one or more areas, such as one or more premises, one or more buildings, etc., of one or more distribution centers. The distribution center inventory (ies) can include one or more inventories associated with one or more portions (e.g., an entire portion or one or more partial portions) of one or more of the distribution center(s). The distribution center operating status(es) can include one or more operating statuses associated with one or more portions (e.g., an entire portion or one or more partial portions) of one or more of the distribution center(s).

The distribution center capability status(es) can include one or more capability statuses associated with one or more portions (e.g., an entire portion or one or more partial portions) of one or more of the distribution center(s), such as whether the distribution center(s) is capable of being utilized for one or more automated deliveries (also referred to herein simply as "customized path delivery(ies)" and "customized delivery(ies)") and/or one or more partially automated deliveries (also referred to herein simply as "customized path delivery(ies)" and "customized delivery(ies)"), based on one or more software capabilities (e.g., software types, versions, etc.), one or more staffing (e.g., member) capabilities (e.g., skills, proficiencies, etc.), and/or any other information included in the distribution center information. The distribution center vehicle type(s) can include one or more vehicle types associated with one or more vehicles (e.g., one or more autonomous vehicles, one or more semiautonomous vehicles, etc.) of one or more of the distribution center(s), such as any of the vehicles 500, as discussed below with reference to FIG. 5. The distribution center vehicle status(es) can include one or more status associated with one or more of the vehicle(s) (e.g., the autonomous vehicle(s), the semiautonomous vehicle(s), etc.) of one or more of the distribution center(s), such as any of the vehicles 500, as discussed below with reference to FIG. 5.

The status information included in the delivery management information can include one or more statuses associated with one or more information in the delivery management information. In some examples, the status(es) can include one or more statuses associated with one or more of the service provider(s), the thirdparty(ies), the user(s) (e.g., the user profile(s)), the item delivery information, and/or one or more of any other information of any type in the delivery management information.

In some examples, one or more statuses associated with a service provider can include a service provider status of any type, such as a status indicating whether the service provider currently provides automated delivery(ies) or partially automated delivery(ies), and/or has activated automated delivery(ies) or partially automated delivery(ies) (e.g., has deemed automated delivery(ies) or partially automated delivery(ies) as automated), such as by setting an automated delivery identifier (or "state") and/or a partially automated delivery state to be activated). In those or other examples, the status associated with the service provider can include a status indicating whether the service provider activated the item delivery(ies) for an area, a user, a user device 116, and so on, or any combination thereof. The status indicating whether the service provider activated the item delivery(ies) for the area can include a status indicating whether the service provider activated the item delivery(ies) for an area associated with a user, a group of users, a user device 116, a group of user devices 116, a premises of the user, a premises associated with the user device 116, a group of premises of the users, a group of premises associated with the user device 116, an address, a group of addresses, any/or one or more other various types of areas, or any combination thereof.

Although the status being identified can include any one of various types of statuses (e.g., the status associated with the user, the user device 116, the service provider, etc.) as discussed above in the current disclosure, it is not limited as such. In some examples, any number of statuses (e.g., one or more statuses associated with the user, the user device 116, the service provider, the third party, one or more third-party devices associated with the third party, etc.) of any types can be identified and utilized for the automated delivery(ies) in a similar way as any of the statuses discussed herein, to implement any of the techniques discussed herein.

In some examples, the third party(ies) can utilized the third-party server(s) to communicate with the position and mapping management system 102 for arranging on or more item delivery(ies). The third party(ies) can utilize the third-party server(s) to exchange one or more communications with the position and mapping management system 102 to perform the item delivery(ies) utilizing the position and mapping management system 102 and/or the user device(s) 116 in a similar way as the item delivery(ies) performed utilizing the position and mapping management system 102 and/or the user device(s) 116, according to any of the techniques as discussed herein.

In some examples, one or more statuses associated with the user(s) can include one or more user statuses of any type, such as one or more statuses indicating whether the user(s) is currently associated with one or more aspects of automated delivery(ies) or partially automated delivery(ies) being deemed activated, and/or is associated with activated automated delivery(ies) or partially automated delivery(ies) being deemed activated. In those or other examples, the status(es) associated with the user(s) can include one or more statuses indicating whether the user(s) are associated with the item delivery(ies) for one or more areas, one or more of the user(s), one or more of the user device(s) 116, and so on, or any combination thereof. The status(es) indicating whether the user(s) are associated with the item delivery(ies) being deemed activated for the area(s) can include one or more statuses indicating whether the user(s) are associated with the item delivery(ies) being deemed activated for one or more of the area(s) associated with one or more of the user(s), one or more of the group(s) of one or more of the user(s), the user device(s) 116, one or more of the group(s) of one or more of the user device(s) 116, one or more of the premise(s) of the user(s), one or more of the premise(s) associated with the user device(s), one or more of the group(s) of one or more of the premise(s) of the user(s), one or more of the group(s) of one or more of the premise(s) associated with the user device(s) 116, one or more of the address(es), one or more of the group(s) of one or more of the address(es), any/or one or more of other various types of areas, or any combination thereof.

Although the status(es) can include one or more statuses associated with one or more of the service provider(s), the third party(ies), and/or the user(s) as discussed above in the current disclosure, it is not limited as such. In some examples, one or more statuses associated with one or more other information of any type in the delivery management information can be identified in a similar way as for the status(es) associated with one or more of the service provider(s), the third party(ies), and/or the user(s). By way of example, the status(es) associated with the one or more other information in the delivery management information can include one or more statuses associated with the user device(s) 116, one or more statuses associated with the customized position(s) 118, one or more statuses associated with the customized path(s) 120, which can be implemented in a similar way as for the status(es) associated with one or more of the service provider(s), the third party(ies), and/or the user(s), to be utilized according to any of the techniques as discussed herein.

Although the term "vehicle(s)" is utilized to refer to the vehicle(s) of various types which can be utilized for the automated delivery(ies), as discussed above in the current disclosure, it is not limited as such. In some examples, one or more of various types of vehicles, such as one or more ground vehicles, one or more robots, one or more drones (e.g., ground drones), one or more unmanned aerial vehicles (AEVs), any of or more types of other vehicles, drones, etc., or any combination thereof, may be utilized to implement one or more of the vehicle(s) according to any of the techniques as discussed throughout this disclosure.

Although the customized position(s) 118 and the customized path(s) 120 can be identified and/or generated based on one or more of the various types of selection(s), and/or various types of information (e.g., the validation information, the confirmation information, etc.), as discussed above in the current disclosure, it is not limited as such. In some examples, the ML model component(s) can be utilized, alternatively or additionally to the position management component(s) 108 and/or the path management component(s) 110, in a similar way as for the position management component(s) 108 and/or the path management component(s) 110, to implement any of the techniques discussed throughout this disclosure. The ML model component(s) can be trained based on any of one or more training results of identifying and/or generating of the customized position(s) 118 and/or the customized path(s) 120 (e.g., any number of the customized position(s) 118 and/or the customized path(s) 120 associated with any number of users, user device(s) 116 associated with corresponding identifiers (e.g., addresses(s)), etc.) being previously performed.

Patterns between types of vehicle(s), types of object(s), types of terrain(s), etc., can be utilized to train the ML model component(s) to subsequently identify the customized position(s) 118 and the customized path(s) 120. Aspects of the types of vehicle(s), the types of object(s), the types of terrain(s), etc. can be utilized to train the ML model component(s), such as aspects including sensitivities, monetary values, sentimental values, cultural values, etc. For example, the ML model component(s) can provide larger distances between objects and the customized position(s) 118, and/or between the objects and the customized path(s) 120 for greater values associated with the object for the sensitivities, monetary values, sentimental values, cultural values, etc. than for lower values associated with others for the sensitivities, monetary values, sentimental values, cultural values, etc.

For example, with instances in which the ML model component(s) are utilized to identify and/or generate the customized position(s) 118, the sensor data generated by the user device(s) 116 can be analyzed utilizing the ML model component(s), based on one or more training results (e.g., one or more training customized positions previously identified and/or generated) (e.g., one or more training validation information, one or more training confirmation information, etc., previously identified) associated with one or more portions of training information (e.g., training delivery management information) previously identified). The training result(s) can be identified based on user input which can be associated with each of one or more previously identified results, and which can be utilized to identify one or more of the previously determining result(s) as being one or more of the training result(s). The one or more of the previously determining result(s) may be identified as being one or more of the training result(s), for example, based on one or more users identifying the previously determining result(s) as being desired, accurate, correct, acceptable, etc., or any combination thereof.

In some examples one or more other components in one or more other devices (e.g., one or more other service provider devices (e.g., one or more of the content server(s) 604, as discussed below with reference to FIG. 6), one or more third-party devices (e.g., one or more of the third-party server(s) 608, as discussed below with reference to FIG. 6)) can be utilized alternatively or additionally to the position management component(s) 108 and/or the path management component(s) 110, in a similar way as for the position management component(s) 108 and/or the path management component(s) 110, to implement any of the techniques discussed throughout this disclosure. The other component(s) and/or the other device(s) can provide and/or be utilized to identify various types of data, such as geographic data (e.g., GPS coordinates, latitudinal and longitudinal coordinates), public data, zip code data (e.g., one or more zip codes), weather data (e.g., one or more weather patterns (e.g., one or more local, regional, global, and so on, weather patterns)), delivery data preference data (e.g., data identified and/or stored in the content server(s) 604 identifying one or more user and/or service provider preferences for the delivery(ies)), order frequency data (e.g., one or more frequencies for one or more orders of various types of the delivery(ies), such as a delivery associated with a pick-up location, a drop-off location, a type of item, etc.), and so on. Any types of the various types of data can be utilized to identify the customized path(s) 116, the customized position(s) 118, the waypoint(s), start point(s), end point(s), or any combination thereof. A start point can be identified based on GPS coordinates, for example, so that a vehicle can traverse from a delivery vehicle to a start of a customized path.

Although the position management component(s) 108, the path management component(s) 110, and the ML model component(s) 112 are included in the position and mapping management system 102 as separate components, as discussed above in the current disclosure, it is not limited as such. In some examples, one or more of the position management component(s) 108, the path management component(s) 110, and the ML model component(s) 112 can be integrated and/or combined together into one or more integrated and/or combined components and utilized according to any of the techniques discussed herein.

Although the user device(s) 116 can be utilized to identify the customized position(s) 118 and/or the customized path(s) 120, as discussed above according to the current disclosure, it is not limited as such. In some examples, one or more other devices can be utilized, additionally or alternatively, to the user device(s) 116. The other device(s), for example, can include one or more devices not being held by the user(s), such as one or more premises devices (e.g., a device mounted on a fixture (e.g., a house, a building, etc.) of a premises) (e.g., a device installed in, or near, a premises), one or more devices mounted on a vehicle, and so on, or any combination thereof. The other device(s) can be controlled to identify the position(s) 118 and/or the customized path(s) 120, for example, by utilizing the application, in a similar way as for the position(s) 118 and/or the customized path(s) 120 being identified utilizing the user device(s) 116.

In some examples, the user(s) can control the application to output camera data (e.g., image data (e.g., one or more images) and/or video data (e.g., one or more videos)). In those or other examples, the user(s) can utilize one or more touches (e.g., one or more drag touches, one or more tap touches, etc.) received via user input to one or more devices (e.g., the user device(s) 116 and/or one or more other devices) executing the same application, a similar application, and/or a different application to identify the customized position(s) 118 and/or the customized path(s) 120 in a similar way as discussed above for how the camera data generated by the user device(s) 116 is utilized. For example, the touch(es) can be received dynamically (e.g., live, or in real time) during generation of the camera data and/or during playback of the camera data.

Although automated delivery(ies) (e.g., customized path delivery(ies)) can be performed utilizing vehicles, bots, etc., as discussed above in the current disclosure, it is not limited as such. In some examples, customized path delivery(ies) can be performed by humans in a similar way as for the automated delivery(ies) utilizing the vehicles, bots, etc., for implementation of any of the techniques discussed herein.

As a hypothetical example, a service provider can establish a delivery system (e.g., an automated delivery system and/or a partially automated delivery system), including, in some cases, by modifying an existing delivery system (e.g., an existing automated, partially automated, or manual delivery system). The delivery system can be utilized to enroll users (e.g., customers) for deliveries, such as automated deliveries (e.g., fully automated deliveries and/or partially automated deliveries). The users can enroll themselves by submitting sign-up requests to sign up for the automated deliveries and/or can be enrolled (e.g., automatically enrolled) by the service provider based on various criteria (e.g., location, shopping history, browsing history, etc.) (e.g., eligibility based on premises being flat enough and large enough for vehicles (e.g., automated vehicles (e.g., autonomous vehicles, semiautonomous vehicles, etc.), robots, bots, etc.) that will make deliveries) established by the service provider.

In the hypothetical example, user profiles of the users can be activated based on the service provider determining the users and/or the user profiles are eligible for the automated deliveries. The users and/or the user profiles can be identified as being eligible based on the sign-up requests sent to the users and/or the criteria. The users can utilize user devices to identify positions and mapping (delivery locations and routes) to be utilized by the vehicles for making the automated deliveries. The positions can be utilized as customized positions for the vehicle to deliver items at the customized positions. The mapping can be utilized as customized paths for the travel to deliver the items at the customized positions.

In the hypothetical example, the users can identify representations of the customized positions using the user devices. The representations can be identified by the users using apps on their mobile devices (e.g., cellular phones) to take videos of their premises, such as their driveways, walkways, stairs, or other areas of fronts, rears, and/or sides of their residences (e.g., houses, apartments, condos, etc.) that the vehicles will need to traverse to get from the street to the residences. The apps can be utilized to identify the customized positions based on the users accessing their profiles, navigating to delivery setup screens, selecting customized position establishment modes, taking videos, and tapping the screens while the videos are being taken (or in the videos while they are being replayed, afterward).

In the hypothetical example, the representations of the customized positions can be depicted while the users are taking the videos based on the users tapping screens of the mobile devices at locations at which the users wish to have items delivered. The representations can be displayed in the videos as they are replayed after the users finish taking the videos. The representations can include outlines, highlights, or other types of augmented content in shapes of boxes or other shapes that represent hypothetical items and/or that identify where the representations are located in the premises. The apps can possibly provide an option for the users to take photos instead of videos, so that the users can display images in the apps based on the photos of portions of their premises. In those cases, the users can tap on the images to have the representations added to the images. Similarly, the user can tap on an overhead image (e.g., a map) and have representations added to the map. In other embodiments, the users may provide audio (e.g., voice commands, voice recordings, etc.) or textual inputs (e.g., typed input) that indicate the preferred customized positions.

In the hypothetical example, the user devices can identify the customized positions independently, and/or the user devices can communicate the sensor data and any selections of the users to the service provider systems. The service provider systems can utilize the information received from the user's devices to analyze the customized positions and validate the customized positions if they satisfy predetermined position criteria. The customized positions being validated can be utilized by the service provider systems to identify the user profiles as being deemed as partially activated user profiles for automated deliveries.

In the hypothetical example, after the customized positions are identified, the user's devices can be utilized to identify representations of customized paths. By identifying the customized positions, the apps can include the representations of the customized positions in output of the videos being taken for identifying the customized paths; or the representations of the customized positions can be included, along with the representations of the customized paths, in playback of the videos taken to identify the customized paths after the users finish taking them. However, the apps can be enabled to allow the users to identify the customized positions and the customized paths in any order.

In the hypothetical example, the users can identify the customized paths by taking videos selecting waypoints, which are used to identify segments of the customized paths between the waypoints as well as segments connected to beginning and ends points of the customized paths. The user devices can identify the waypoints and segments by themselves, and/or the user devices can communicate the sensor data and any selections of the users to the service provider systems. The service provider systems can utilize the information received from the user's devices to analyze the customized paths and validate the customized paths if they satisfy predetermined path criteria. The customized paths (as well as the customized positions) being validated can be utilized by the service provider systems to identify the user profiles as being deemed as fully activated user profiles for automated deliveries.

In the hypothetical example, the validation can include identifying whether any data (e.g., data associated with a user, a user device, a customized position, a customized path, and so on) is fraudulent data. By identifying and filtering out fraudulent data, data that is received from "bad actors" attempting to purposefully send the vehicles and/or robots along treacherous paths can be ignored and/or flagged to identify subsequent fraudulent data. Ignoring fraudulent data prevents the vehicles/bots from being controlled to move redundantly up and down steps, or to move along extended distances that exceed a predetermined limit, and so on.

In the hypothetical example, the activated user profiles (e.g., the fully activated user profiles) can be utilized for the automated deliveries. The automated deliveries can be performed by the vehicles, which can utilize the customized paths to traverse the premises of the users from the street or other areas outside the premises, to the customized positions. The vehicles can deliver the items by utilizing belts, springs, hydraulics, robotic arms, levers, and/or various components to slide, eject, or place the items to the customized positions, and then the vehicles can leave (such as by traversing the customized paths back to the areas outside the premises). Additionally or alternatively, the vehicles can possibly remain at or near the customized positions with the items in the vehicles to be collected by the users, and then the vehicles can use the customized paths to leave. Whether the vehicles deliver the items and leave without waiting for the users, or whether the vehicles wait for the items to be collected before leaving, can possibly be selected by the users using the app (such as by selections for all deliveries, for individual deliveries, for deliveries of certain types of items, for deliveries on certain days or at certain times, etc.).

In the hypothetical example, one or more ML models can be executed by a service provider server in communication with the user device to identify the customized position and/or the customized path, and/or any information utilized for, and/or associated with, identification of the customized position and/or the customized path. The ML model(s) can be trained based on user input received as part of previous identifications made of previous customized positions and/ or the customized paths, and/or feedback received from users (e.g., customers, operators, etc.) regarding the previous customized position and/or the customized paths.

In another hypothetical example, a customized position can be "painted" onto a video while the video is being captured and/or during playback by utilizing an application executing on a user mobile device. The customized position can be "painted" to appear as if a target on the screen is a spray paint nozzle. The customized position can be selected and/or set with a selection of a button (e.g., a "+" button) being output. Next, a customized path can be "painted" by the user directing the mobile device and the camera. The customized path can be "painted" to appear as if a target on the screen is a spray paint nozzle. The customized path can be selected and/or set with a selection of a button (e.g., a "+" button) being output. While the customized path is being "painted," or after the path is set, the user device and/or the service provider server can analyze the path, identify one or more waypoints, and display the waypoints on the screen along with the path. The target(s) (e.g., or reticule(s)) can be positioned at a center of the screen, from which a continuous spline is created as a user device sensor (e.g., camera) is pointed to one or more positions.

In the hypothetical example, the waypoint(s) can be identified based on various aspects of the environment. A waypoint, for example, can be identified automatically (e.g., computer generated) and/or manually (e.g., user identified) and/or set at a position associated with a corner of the path (e.g., a drastic change in direction), a curvature (e.g., a slight change in direction), a change in elevation, a particular/ threshold elevation, a feature (e.g., a beginning of a lawn, a stone, a step, etc.). In some examples, a customized position, a customized path, and/or waypoints can be automatically identified and generated based on the "painting" after a selection process is started, without requiring additional touches and/or activations by a user.

In another hypothetical example, a customized path and/ or a customized position can be identified based on a camera (e.g., the user device camera, a premises camera, etc.) recording an object traversing (e.g., a human walking, a bot being controlled, etc.) through a premises. For example, positions and paths identified based on packages being delivered by humans over a course of time can be identified (e.g., the most common paths and positions utilized to deliver packages can be set and/or identified for confirmation and/or validation for identifying the customized paths and customized positions). The user device and/or the service provider device can automatically identify an individual path of an item delivery and/or the most frequently travelled path of humans or bots for item deliveries as the customized path, additionally or alternatively to automatically identifying an individual position of an item delivery and/or a position at which items are most frequently delivered as the customized position. Such recording-based human- or bot-identified positions and/or paths for customized position(s) and/or customized path(s) can be identified and/or utilized in a similar way as the customized positions and/or the customized paths generated according to any techniques herein.

In another hypothetical example, the customized path can be selected based on internal dynamics identified for a particular bot or vehicle. Larger turns can be used for larger bots and/or for bots that do not turn quickly enough. Thresholds identified based on the dynamics can be utilized to set the turning radius. In some examples, the application can play a virtual delivery (e.g., a hypothetical delivery) showing the bot as a virtual representation (e.g., highlighted bot, a dashed line representation of a bot, etc.) in augmented data during playback. The bot can be shown to traverse the path and can be validated by the user and/or a device (e.g., a user device, a service provider device, etc.) as successfully traversing the path or failing to traverse the path successfully. A failure could include a bot going over lawn (e.g., soft grass), flowers, ornaments, and/or objects, a bot hitting an object or a fixture, a bot being mechanically unable to follow the path, etc.

In the hypothetical example, the user can, based on any failures, which can be identified by notifications output on the screen one at a time, all at once, etc., create a new path or make modifications to a portion of the path associated with the failure. The user can modify the path during the playback or after playing finishes and then replay the virtual delivery, to make additional modifications, until a successful position and path are identified. In some cases, the playback and modifications can be performed iteratively until complete. In some examples, solutions can be proposed by the ML component(s) based on failures, and the output via notifications to the users to accept or reject the proposed solutions.

In another hypothetical example, a third party, such as another distribution company, can be enrolled to be utilize components of the service provider server for automated deliveries. The third party can exchange communications with the service provider server and/or the user device (with the same app and/or with a different, third-party app) to obtain the customized paths, the customized positions, and/ or to request deliveries via the vehicles that use the customized paths and/or the customized positions.

In another hypothetical example, the metric(s) can include one or more visibility metrics. The visibility metric(s) can be utilized to identify whether lighting is strong or weak (e.g., good or bad) and assign a metric for good lighting to be relatively higher than for bad lighting. Visibility data including and/or associated with the visibility metric(s) can be utilized to filter out false positive identifications of objects. For example, the visibility data can be analyzed utilizing a component (e.g., an ML component) to identify that a portion of camera data identified as an object is actually a shadow. The object can be re-identified as the shadow and ignored for purposes of identifying the customized path or the waypoint(s). By identifying shadows or other similar data that is misidentified and/or misconstrued as objects (e.g., obstructions), the path can be created (e.g., generated) to be smoother by not having to veer around the misidentified object.

In another hypothetical example, a customized position and/or a customized path can be utilized for human delivery. A human (e.g., a delivery driver) can access the customized position and/or the customized path and utilize them for making a delivery of an item, by following the path and dropping the item off at the position. The delivery might include the item not following the path in terms of all coordinates (e.g., the human may carry the item higher than a robot) and/or might include the human using independent judgment to navigate along the path by veering off whenever necessary. In some example, the application can be utilized by the user to generate a human delivery position and position and/or path that is different than other positions/ paths for automated delivery. The human can make suggestions to the service provider components and/or the user device for modifications to the position and/or the path.

Figure 2:
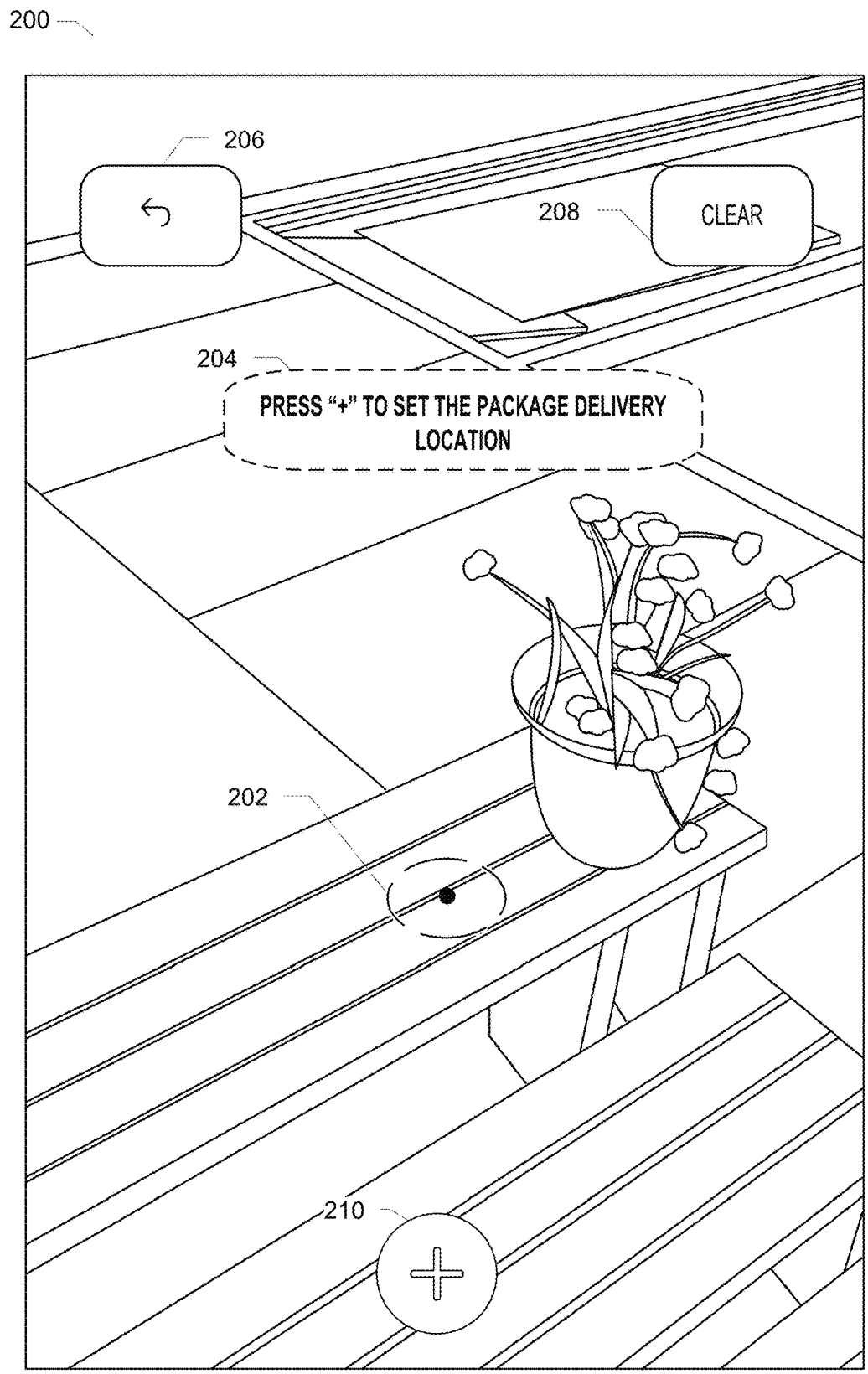
FIG. 2 is an illustrative user interface (UI) for a computing device utilized to receive selections via user input identifying a customized position for customized position management.

FIG. 2 is an illustrative user interface (UI) 200 for a computing device utilized to receive selections via user input identifying a customized position for customized position management. In some examples, the UI 200 can be output by one or more of various types of computing devices, such as a user device (e.g., any of the user device(s) 116, as discussed above with reference to FIG. 1).

The UI 200 can include indications associated with a customized position 202, a package delivery location (or "position") 204, a back 206, a clear 208, and a select 210. The customized position 202 can be identified, generated, output, and/or modified based on sensor data generated by the user device 116.

In some examples, the customized position 202 can include, be implemented as, and/or be indicated by, a customized position indicator. The customized position indicator (e.g., a representative image) associated with the customized position 202 can be output by the UI 200 based on one or more customized position selections received via user input to the UI 200 of the user device 116. The customized position selection(s) can include one or more touches (e.g., one or more tap touches, one or more drag touches, and so on, or any combination thereof). For example, with instances in which the customized position selection(s) include the tap touch, the customized position 202 and/or the customized position indicator can be output as an outline of a circle centered at the tap touch, and, possibly with a dot at a center of the circle. In such an example, one or more values of one or more characteristics (e.g., a diameter, radius, circumference, and so on) can be automatically determined based on one or more predetermined values, and/or manually identified based on the input from the user(s) (e.g., one or more corresponding values of the characteristic(s) can be identified as corresponding to one or more lengths of time of the tap touch, such as with one or more larger values of the characteristic(s) being identified based on one or more respectively longer tap touches, or vice versa, such as with one or more smaller values of the characteristic(s) being identified based on one or more respectively shorter tap touches). By way of another example, with instances in which the customized position selection(s) include the drag touch, the customized position 202 and/or the customized position indicator can be output as an outline of a circle identified based on a center of a circle being at a beginning position of the drag and the outline of the circle being at an ending position of the drag.

Although the customized position 202 and/or the customized position indicator can be output as the outline of the circle with the dot, as discussed above in the current disclosure, it is not limited as such. In some examples, the customized position 202 and/or the customized position indicator can be output as any shape, such as any geometric shape, a customized shape with one or more points utilized to form an outline and/or a boundary of the customized position 202 being at one or more positions of the drag touch.

In some examples, one or more sizes of the customized position 202 can be set to adjust a level of accuracy to be utilized for one or more item deliveries. For example, with instances in which the customized position 202 is output as the circle with the dot, one or more larger sizes of the customized position 202 can be utilized for the item delivery(ies) positioning one or more items within a larger space. In such an example or in another example, the customized position 202 being relatively larger can be associated with a relatively larger margin of error being permitted for deviations of delivered item(s) from a portion (e.g., a center) of the customized position 202. Based on the relatively larger margin of error, relatively greater flexibility can be provided for positions at which the item(s) can be delivered.

One or more of various types of information (e.g., the validation information, the confirmation, etc., as discussed above with reference to FIG. 1) can be identified and/or utilized to the identifying and/or the generating of the customized position 202. By way of example, the validation information (e.g., information utilized to validate the customized position 202) can be identified based on the customized position 202 to identify whether the customized position criteria are satisfied. In such an example or in another example, based on the customized position criteria being satisfied, the confirmation information (e.g., the confirmation selection(s)) can be identified.

In some examples, one or more of the position characteristic(s) identified by the position and mapping management system 102 as being associated with an error, and/or as being invalid, can be flagged as one or more flagged characteristic(s) (e.g., flagged position characteristic(s)). In those or other examples, the flagged characteristic(s) can be based on the corresponding criteria not being satisfied.

Although the customized position 202, and/or the various other types of information (e.g., the validation information, the confirmation) associated with the customized position 202 can be identified and/or generated as discussed above in the current disclosure, it is not limited as such. In some examples, the customized position 202 can be utilized to implement the any of the one or more customized positions and utilized according to any techniques discussed throughout this disclosure, such as the techniques as discussed above with reference to FIG. 1.

In some examples, the customized position 202 can be moved in the UI 200. In those or other examples, moving the customized position 202 can include moving the customized position 202 via one or more drag touches, and/or by activating one or more keys, one or more joysticks, one or more toggle switches, one or more scroll wheels, and so on, or any combination thereof, of the user device 116. In those or other examples, moving the customized position 202 can include moving the customized position 202 by one or more tap touches, such as a tap touch or a drag touch in portion of the UI 200 utilized to control the user device 116 to automatically move the customized position 202 in a direction of the tap touch or the drag touch by a distance (e.g., a predetermined distance, such as 1 millimeter (mm), 5 mms, 10 mms, etc.).

For example, with instances in which the tap touch is utilized to move the customized position 202 based on the tap touch being received at or next to the customized position 202 in a direction with respect to the customized position 202, the customized position 202 can be moved in the direction (e.g., a relative size of a distance in which the customized position 202 can be moved can be identified as a size corresponding to a relative length of time at which the tap touch is received), such that a relatively longer timed tap touch can be utilized to move the customized position 202 by a relatively larger distance, or vice versa, with a relatively shorter timed tap touch can be utilized to move the customized position 202 by a relatively larger distance). In another example, with instances in which the drag touch is utilized to move the customized position 202 based on the drag touch being received at or next to the customized position 202 and being dragged in a direction, the customized position 202 can be moved in the direction (e.g., a relative size of a distance in which the customized position 202 can be moved can identified as corresponding to a relative size of a distance of the drag touch, such that a relatively longer distanced drag touch can be utilized to move the customized position 202 by a relatively larger distance, or vice versa, with a relatively shorter distanced drag touch can be utilized to move the customized position 202 by a relatively larger distance).

In some examples, as the customized positions 202 is moved, one or more characteristics of the customized position 202 can change to indicate one or more levels associated with quality, accuracy, and/or feasibility for the item delivery(ies). The characteristic(s) can include one or more colors, one or more shade levels, one or more outline types (e.g., one or more outline line thicknesses, one or more outline dotted line sizes), one or more blinking frequencies, and so on, or any combination thereof. Changing one or more color characteristics can include one or more colors utilized to identify one or more valid positions, one or more other colors utilized to identify one or more invalid positions, and/or one or more colors representing one or more validity levels associated with the position(s). The color(s) representing the validity level(s) can include a color associated with a highest validity level (e.g., a validity level being greater than or equal to one or more remaining validity levels), a color associated with a next highest validity level (e.g., a validity level being greater than or equal to one or more remaining validity levels except for the highest validity level), and so on, and/or a color associated with a lowest validity level (e.g., a validity level being less than or equal to one or more remaining validity levels, including the highest validity level the next highest validity level, and so on).

In some examples, changing one or more shade level characteristics, one or more outline type characteristics (e.g., one or more outline line thickness characteristics, one or more outline dotted line size characteristics), one or more blinking frequency characteristics, and so on, or any combination thereof, can include changing the shade level(s), the outline type(s) (e.g., the outline line thickness(es), the outline dotted line size(s)), the blinking frequency (ies), and so on, or any combination thereof, in a similar way as for the color characteristic(s). For example, one or more levels of the shade level(s), one or more types of the outline type(s) (e.g., one or more thicknesses of the outline line thickness(es), one or more dotted line sizes of the outline dotted line size(s)), one or more frequencies of the blinking frequency (ies), and so on, or any combination thereof, can be utilized to represent one or more of the validity level(s) in a similar way as for the color(s).

In some examples, the outline dotted line size(s) can include one or more dotted line sizes such at the outline is a dotted line, and/or a dotted line size such that the dots of the line connect to form the line into a solid line. In those or other examples, the blinking frequency (ies) can include one or more blinking frequencies such at the outline blinks at one or more blinking frequencies, and/or a highest "blinking frequency" such that the customized position 202 is continuously displayed without blinking.

For example, with instances in which the customized position 202 indicator is identified as being at an invalid position, the customized position 202 indicator (e.g., a not-yet-validated (or "unvalidated") representative image) can be output at a color (e.g., a first color, such as red), a shade level (e.g., a first shade level), an outline type (e.g., a first outline type) (e.g., an outline line thickness (e.g., a first outline line thickness), an outline dotted line size (e.g., a first outline dotted line size), and a blinking frequency (e.g., a first blinking frequency). In some examples, the customized position 202 being a not-yet-validated customized position can be received and determined by the position and mapping management system 102 as being a not-yet-enabled position, and/or determined by the user device 116 as the not-yet-enabled position. By way of an example, with instances in which the customized position 202 indicator is identified as being at a valid position (e.g., based on the customized position 202 indicator being modified (e.g., moved), the customized position 202 indicator based on one or more modification selections received via user input), the customized position 202 indicator (e.g., a validated representative image) can be output at a color (e.g., a second color, such as green), a shade level (e.g., a second shade level), an outline type (e.g., a second outline type) (e.g., an outline line thickness (e.g., a second outline line thickness), an outline dotted line size (e.g., a second outline dotted line size), and a blinking frequency (e.g., a second blinking frequency).

In some examples, the customized position 202 being a validated customized position 202 can be received and determined by the position and mapping management system 102 as being an enabled position. Additionally, or alternatively, the validated customized position 202 can be determined by the user device 116 as the enabled position.

In some examples, one or more modifications can be made to the customized position 202 indicator (and/or to the customized path 302 indicator and/or the customized path 402 indicator, any of the waypoint(s) 304, and/or any of the waypoint(s) 404, as discussed below with respect to FIGS. 3 and 4), based on one or more modification selections received via user input to the user device 116. Any number of modifications associated with one or more occurrences and/or one or more repetitions of one or more modification selections being received can be performed.

In some examples, one or more distances between one or more portions of the customized path 302 and/or one or more of the waypoint(s) 304 can be identified and/or output. In those or other examples, a distance (e.g., a first distance extending between portions of the customized path 302) (e.g., 5'9") can be identified from a portion (e.g., a start) of the customized path 302 and to a waypoint (e.g., a first waypoint) 304, a distance (e.g., a second distance extending between portions of the customized path 302) (e.g., 3'2") can be identified from the first waypoint 304 and to a next waypoint (e.g., a second waypoint) 304.

In some examples, the customized position 202 can be set based on a package delivery location selection received via user input to the user device 116. For example, the set (or "set indicator") 210 being selected can be utilized to set the customized position 202. In those or other examples, the package delivery location selection being identified as selection of the package delivery location 204 indicator and/or the set 210 indicator can be utilized to set (e.g., fix, establish, etc.) the customized position 202. In those or other examples, the package delivery location selection can be implemented as any of the confirmation selection(s), as discussed above with reference to FIG. 1. The package delivery location 204 indicator and/or the set 210 indicator being selected can include any of one or more types of selections, including selection via activation (e.g., a touch, a press, etc.) of a key associated with a "+" character, selection via a touch received to the package delivery location 204 indicator and/or the set 210 indicator on the UI 200, and so on, or any combination thereof, to identify a location (e.g., a location identified by the target) of the customized position 202.

In some examples, the package delivery location selection can be undone by one or more selections of the package delivery location 204 (e.g., selection(s) to toggle the package delivery location 204 indicator) to un-set (e.g., unfix, de-establish, etc.) the customized position 202. In those or other examples, any number of the selection(s) to set or un-set the customized position 202 can be utilized to set or un-set the customized position 202. In those or other examples, the package delivery location selection can be set by one or more different types of selections of the package delivery location 204 (e.g., a different type of touch).

Although the package delivery location 204 indicator can be utilized to set and/or un-set the customized position 202 as discussed above in the current disclosure, it is not limited as such. In some examples, an initial selection of the package delivery location 204 indicator can be utilized to set the customized position 202 as a final position and to control the user device 116 to output a different screen (e.g., the UI 300 screen, as discussed below with reference to FIG. 3).

In some examples, the customized position 202 indicator can include one or more representations (e.g., one or more outlines, one or more images, one or more icons, etc.) of one or more packages with one or more characteristics (e.g., one or more sizes, one or more shapes, one or more dimensions (e.g., as a two-dimensional object, a three-dimensional object, etc.), one or more colors, and so on, or any combination thereof), one or more objects with one or more of the characteristic(s), and so on. In those or other examples, the representation(s) can be toggled and/or changed from any of the representation(s) to another representation based on one or more representation selections received via user input to the user device 116.

In some examples, one or more notifications (e.g., one or more indicators) can be output by the UI 200, alternatively or in addition to, one or more of the characteristic(s) being output and/or changed. In those or other examples, the notification(s) can include one or more descriptions associated with the characteristic(s). For example, with instances in which a characteristic includes a color of the customized position 202 being red due to the current position being invalid, a notification including text indicating that the position is invalid can be output. In some examples, the notification(s) can include one or more warning notifications based on any invalid information (e.g., partially invalid information or fully invalid information) and/or potentially invalid information (e.g., potentially partially invalid information or potentially fully invalid information) associated with any of the selection(s) (e.g., the customized position selection(s), the customized path selection(s), the modification selection(s), and so on, or any combination thereof) received via user input from the user.

In some examples, the notification(s) can include information with instructions. For example, the notification(s) can instruct the user to move the user device 116 to a different portion of the environment while generating the sensor data and/or identifying the customized position 202.

Although the characteristic(s) can be utilized to output the customized position 202 indication, as discussed above in the current application, it is not limited as such. The characteristic(s) can include any types of one or more characteristics (e.g., one or more orientations, one or more angles, one or more brightness levels, and so on, or any combination thereof) being implemented and utilized for output of any features and according to any techniques as discussed herein.

Although the notification(s) can be output as discussed above in the current application, it is not limited as such. The notification(s) can be output in a similar way as for, or a different way from, the package delivery location 204 indicator, at one or more different portions of the UI 200, and/or with one or more similar and/or different characteristics (e.g., font, color, size, blinking rate, shade level, brightness level, or any combination thereof) as for the package delivery location 204 indicator.

The back 206 indication can be utilized to undo a previous operation, such as the customized position 202 being identified, a modification of the customized position 202, the customized position 202 being set by the package delivery location 220, and so on. The back 206 indication can be utilized to undo any number of one or more previous operations based on one or more back selections of the back 206, the back selections being received via user input to the user device 116. The clear 208 indicator can be utilized to clear all previous operations, such as the customized position 202 being identified, one or more modifications of the customized position 202, the customized position 202 being set by the package delivery location 220, and so on.

Although user input can be received by one or more touches, one or more activation associated with one or more various types of keys (e.g., one or more keyboard keys and/or one or more keys of other types), one or more mouse buttons, one or more joysticks, one or more toggle switches, one or more scroll wheels, and so on, or any combination thereof, of the user device 116, can be utilized to control the user device 116, as discussed according to the current disclosure, it is not limited as such. In some examples, one or more of any of the touch(es), the activation(s) associated with the various types of key(s), the mouse button(s), the joystick(s), the toggle switch(es), the scroll wheel(s), one or more portions of any type of the user device 116, and so on, or any combination thereof, can be utilized to implement any of the touch(es), the activation(s) associated with the various types of key(s), the mouse button(s), the joystick(s), the toggle switch(es), the scroll wheel(s), one or more portions, of any type of the user device 116, and so on, or any combination thereof, and utilized interchangeably according to any techniques discussed herein.

Although the notification(s) can be output as discussed above in the current application, it is not limited as such. The notification(s) can be output and utilized to receive one or more feedback indications. The feedback indication(s) (e.g., one or more user input indications that include and/or identify feedback, e.g., text, one or more feedback/error codes, abbreviations, etc., or any combination thereof) can be received by one or more feedback selection(s) via user input of any type to the user device 116. The feedback indication(s) can be received in response to the notification (s) being output along with one or more feedback request indications for the feedback indications (e.g., the feedback request indication(s) can be automatically output with the notification(s)). In some examples, the notification(s) can be selectable and utilized as the feedback request indication(s), and can be output in a similar way as, or a different way from the notification(s) not being selectable and utilizable as the feedback request indication(s). For example, the notification(s) being selectable and utilizable as the feedback request indication(s) can be output with one or more characteristics (e.g., a relatively darker and/or brighter level); and the notification(s) not being selectable and utilizable as the feedback request indication(s) can be output with one or more characteristics (e.g., a relatively lighter and/or dimmer level) that are the same or different as the characteristic(s) for the notification(s) being selectable and utilizable.

In some examples, the feedback indication(s) can be received separately from the notification(s) based on user initiated feedback selection(s). In some examples, the user initiated feedback selection(s) can be received via a user initiated feedback indicator output in a similar way as, or a different way from, the back 206 indicator and/or the clear 208 indicator. In some examples, the feedback can be utilized by operators to modify the position management component(s) 108 and/or the path management component(s) 110. In those or other examples, the feedback can be input to the ML model component(s) 112 and utilized to train the ML model component(s) 112.

Although one or more notifications and/or one or more indicators can be output by the user device(s) 116, as discussed above in the current application, it is not limited as such. In some examples, one or more of the notification(s) and/or one or more of the indicators can be output based on one or more requests received from the position and mapping management system 102. In those or other examples, the request(s) can include one or more requests (e.g., one or more customized position requests, one or more customized path requests, one or more feedback requests, one or more warning requests, and so on, or any combination thereof) utilized to cause and/or control the user device(s) 116 to perform any of the operations according to any of the techniques as discussed herein.

In those or other examples, one or more responses can be transmitted by the user device(s) 116 and to the position and mapping management system 102, based on one or more of the notification(s) and/or one or more of the indicators. In those or other examples, the response(s) can include one or more responses (e.g., one or more customized position responses, one or more customized path responses, one or more feedback requests, one or more warning responses, and so on, or any combination thereof) associated with the user device(s) 116 performing any of the operations according to any of the techniques as discussed herein.

In a hypothetical example, a user device can execute an app utilized by a user to identify a customized position. The user can open the app and select a mode (e.g., a customized position establishing mode) for establishing automated deliveries using the customized position. The app can display a screen that allows the user to take a photo or a video. The user can open the photo and/or replay the video and select a location of a premises of the user in the photo or the video, such as by tapping the photo or video. Or, for a case in which the user takes the video, the user can tap the screen while the video is being taken to identify the location.

In the hypothetical example, the app can create an indicator of the representation of the customized position, such as augmented content including a circle and a dot (e.g., a target). The indicator can be shown in the image. In the case of the user using the video, the app can freeze the video. Freezing the video can be controlled by the app based on identifying a frame that centers the indicator or that shows the indicator clearly (or the user can move between frames at a predetermined or user selected frame interval, crop a portion of a frame, pan between portions of a frame, enlarge a portion of a frame, or otherwise manipulate the video in various ways to output an easily identifiable portion of the premises). A screen shot and/or fixed portion of a frame, which can be identified based on a user selection received using the app, can be utilized to modify or set the customized position (during capturing of the video or after the video is finished being captured).

In the hypothetical example, the user device and/or a service provider can utilize various types of sensor data to identify the customized position based on the input from the user. The sensor data can include camera data and lidar data, which can be fused to identify information about the premises as well as a portion of the premises that will be utilized as the customized position.

In the hypothetical example, the indicator of the representation of the customized position in the image and/or the frame can be moved by the user, such as by tapping the screen to drag the indicator, select a key to move the indicator vertically or horizontally, and so on. The user can enlarge or shrink the indicator to set larger areas where items can be delivered, or smaller areas.

In the hypothetical example, the user device and/or the service provider system can analyze the images with the customized position indicator to determine whether the customized position is valid. Various types of criteria can be utilized to determine validity of the customized position, such as based on various metrics including, for example, whether the vehicles will have enough space from other objects in the premises to stop at the customized position and/or to deliver items. Other metrics may include, for example, whether a surface of the ground or object on which the customized position is located is robust and flat enough for movement/positioning of the robot and placement of items, or various other types of metrics.

In the hypothetical example, the app can be executed by the user device and/or be controlled by the service provider system to output different characteristics of the indicator. The characteristics can enable the users to determine whether the customized position is valid or not. For example, the indicator may be output in a red color or may blink to indicate that the customized position is not valid, such as if the user initially places the customized position indicator on a surface with a slope that is too great (e.g., greater than or equal to a threshold slope), on a surface that is too soft (e.g., greater than or equal to a firmness level), too close to other objects (e.g., spaced less than or equal to a threshold distance from another object), in an area that is too small for the item to be delivered and/or for the vehicle to travel, in an area where it would be difficult for the vehicle to locate, and so on. Initial validation can be utilized to determine whether the customized position is not yet valid.

In the hypothetical example, the user can utilize the app to modify the location or the size of the customized position indicator. The user can tap a center of the target and drag the target to a new location or drag an edge (e.g., circle, boundary) of the target closer to the center to decrease a size of the target. As the user modifies the indicator, the user device and/or a service provider system can analyze the criteria based on the metrics and modify the characteristics of the indicator, such as by determining the criteria is satisfied due to the modifications. For example, the indicator can change from red to green based on the user moving the indicator from being centered on an edge of a step to a center of a surface of the step, or from a middle step to a stop step. Subsequent validation, such as intermediary validation or final validation, can be utilized to determine whether the customized position is valid. If the initial validation includes determining the customized position is valid, the initial validation can also be the final validation.

In the hypothetical example, the app can interact with the users providing warnings, suggestions, instructions, or any other notifications to assist the user to place the customized position indicator in a valid location. The app can display a notification for the user to set the customized position after the customized position is validated. The app can display indicators for the user to undo an action, unset the customized position, or to clear all information so that the user can start again (by generating new sensor data and/or by identifying a new customized position representation).

Figure 3:
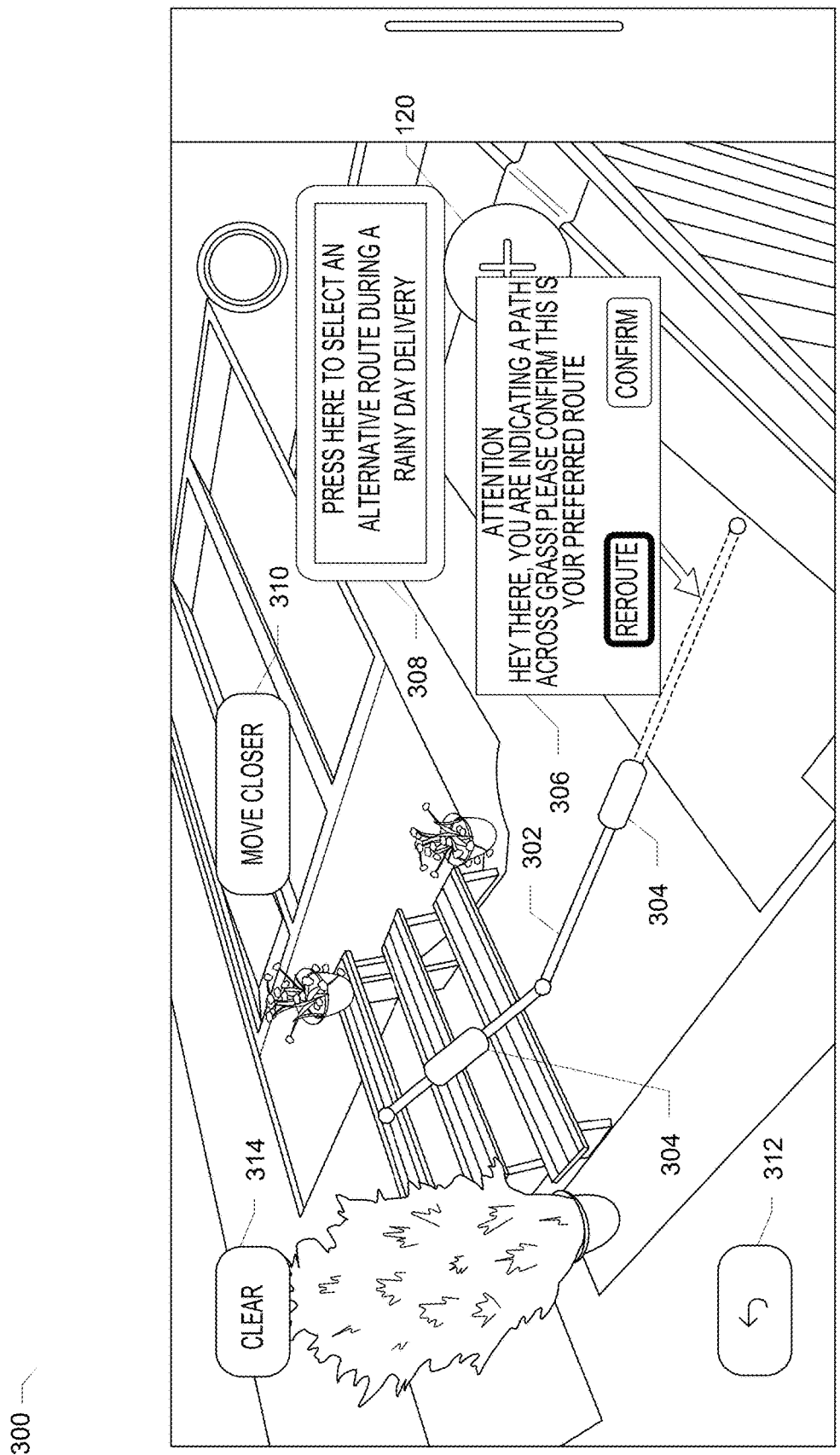
FIG. 3 is an illustrative user interface (UI) for a computing device utilized to receive selections via user input identifying a customized path as an unvalidated path for customized path management.

FIG. 3 is an illustrative user interface (UI) 300 for a computing device utilized to receive selections via user input identifying a customized path as an unvalidated path for customized path management. A UI 300 screen can be utilized to identify, generate, output, and/or modify one or more customized paths (e.g., the customized path(s) 120, as discussed above with reference to FIG. 1), such a customized path 302.

In some examples, the customized path 302 can be identified, generated and/or output based on one or more selections (e.g., one or more selections of any type as discussed above with reference to FIG. 2), based on sensor data generated by the user device 116. In those or other examples, the customized path 302 can be identified, generated and/or output based on one or more drag touches received via user input by a user device (e.g., the user device 116, as discussed above with reference to FIG. 1).

Although the customized path 302 can be identified, generated, output, and/or modified based on one or more drag touches, as discussed above in the current disclosure, it is not limited as such. In some examples, the customized path 302 can be identified, generated, output, and/or modified in any way, such as manually and/or automatically, as discussed above with reference to FIG. 1.

One or more waypoints 304 can be identified, generated, output, and/or modified in a similar way as for the waypoint(s) 304 as discussed above with reference to FIG. 1. In some examples, the waypoint(s) 304 can be generated at one or more portions of the UI 300 screen based on one or more waypoint selections (e.g., one or more touches) associated with one or more portions of the customized path 302. In those or other examples, the customized path 302 can be identified, followed by the waypoint(s) 304 being identified.

Although the waypoint(s) 304 can be identified based on the customized path 302, as discussed above in the current disclosure, it is not limited as such. In some examples, the waypoint(s) 304 can be identified and utilized to identify the customized path 302. In those or other examples, the customized path 302 can be generated as lines (e.g., one or more straight lines connected together, one or more natural fit lines with one or more curves having one or more curvature levels being less than or equal to one or more curvature level thresholds, etc.) connecting adjacent waypoints 304. In those or other examples, the customized path 302 can be automatically generated by the position and mapping management system 102 (e.g., the path management component(s) 112, the ML model component(s) 112, etc., or any combination thereof).

In some examples, the customized path 302 can be identified, generated, output, and/or modified in a similar way as, or a different way from, one or more customized positions (e.g., the customized position 202, as discussed above with reference to FIG. 2). In those or other examples, the customized path 302 can be identified, generated, output, and/or modified with one or more of the characteristics(s). In those or other examples, modifying the customized path 302 can be performed as one or more modifications based on one or more modification selections in a similar way as for the customized position 202. In those or other examples, one or more portions of the customized path 302 can be modified in a similar way as for the customized position 202. In some examples, the customized path 302 can be output using one or more representations and/or by changing the representation(s) in a similar way as for the customized position 202.

In some examples, one or more notifications can be output for the customized path 302 in a similar way as for the customized position 202. In those or other examples, one or more feedback indications can be received for the customized path 302 in a similar way as for the customized position 202.

In some examples, the customized path 302 can be output based on the for the customized position 204 indicator, with a portion (e.g., an end) of the customized path 302 being fixed (e.g., "tied") to a portion of the customized position 204 indicator. In those or other examples, one or more modifications can be utilized to output one or more portions of the customized path 302 at one or more same, similar, and/or different portions of the UI 300 screen, with the portion of the customized path 302 being fixed to the portion of the customized position 204 indicator automatically remaining in a same portion of the UI 300 screen. In those or other examples, the portion of the customized path 302 being fixed to the portion of the customized position 204 indicator can be unfixed based on one or more unfix selections being received. The unfix selection(s) can include one or more selection of any type, such as a touch of any type at the fixed portion of the customized path 302, a modification of a setting by one or more selections of one or more menu indicators output by the UI 300 screen, and so on, or any combination thereof. In those or other examples, the portion of the customized path 302 being unfixed can be fixed (e.g., refixed) in a similar or different way from the portion of the customized path 302 being fixed.

In some examples, one or more selections of any number can be utilized to fix and/or unfix one or more portions of the customized path 302 to the customized position 204 indicator. In those or other examples, one or more selections of any number can be utilized to fix and/or unfix one or more portions of the customized path 302 to one or more items output in the UI 300 screen of any type, and/or to fix and/or unfix one or more portions of the customized path 302 to one or more positions of the UI 300 screen. In those or other examples, one or more portions of the customized path 302 can be fixed and/or unfixed by a package delivery mapping indicator in a similar way as the package delivery location 204 indicator being utilized to set and/or un-set the customized position 204 indicator.

In some examples, one or more characteristics and/or one or more notifications, such as an attention 306 indicator, can be utilized to output information associated with one or more portions of the customized path 302. The characteristic(s) and/or notifications, such as the attention 306 indicator, associated with one or more portions of the customized path 302 can be identified and output information in a similar way as for the characteristic(s) and/or notifications associated with the customized position 204 indicator, as discussed above with reference to FIG. 2. In some or other examples, the characteristic(s) and/or notifications can identify the portion(s) of the customized path 302, by utilizing the characteristic(s) and/or notifications.

For example, with instances in which the attention 306 indicator is output, a portion of the customized path 302 can be identified based on an indicator (e.g., an arrow, a line, a shadow, etc.) and/or based on a portion, an extension, etc. of the attention 306 indicator. In such an example or another example, the portion of the customized path 302 can be identified based on a different characteristic (e.g., a dotted line, in contrast to a solid line associated with one or more remaining portions of the customized path 302).

One or more modification selections being received, such as based on the characteristic(s) and/or notifications (e.g., the attention 306 indicator) can be utilized to modify the customized path 302 in a similar way as for the modification(s) associated with the customized position 204 indicator. The characteristic(s) and/or notifications can be modified, and/or new characteristic(s) and/or new notifications can be identified, based on the modification(s) of the customized path 302.

In some examples, the characteristic(s) and/or notifications associated with one or more portions of the customized path can be identified based on validation information (e.g., information utilized to validate the customized path 302), which can be managed in a similar way as for the validation information for the customized position 204 indicator, as discussed above with reference to FIG. 2. By way of example, a portion of the customized path 302 can be identified based on validation information indicating that customized path criteria (e.g., one or more criteria being similar to or different from the customized position criteria) is satisfied for the portion of the customized path 302. In those or other examples, the customized path criteria being satisfied can be based on one or more customized path metrics (e.g., one or more metrics being similar to or different from the customized position metric(s)) associated with the portion of the customized path 302 being satisfactory with respect to one or more metric thresholds (e.g., one or more metric thresholds being similar to or different from the customized position metric thresholds).

In some examples, one or more of the characteristic(s) identified by the position and mapping management system 102 as being associated with an error, and/or as being invalid, can be flagged as one or more flagged characteristic(s) (e.g., flagged path characteristic(s)). In those or other examples, the flagged characteristic(s) can be based on the corresponding criteria not being satisfied.

In some examples, the customized path 302 (e.g., which can be utilized to determine the path 402, as discussed below with reference to FIG. 4, as a validated path) being determined as a not-yet-validated customized path can be received and determined by the position and mapping management system 102 as a not-yet-enabled path. Additionally, or alternatively, the not-yet-validated customized path 302 can be determined by the user device 116 as the not-yet-enabled path.

In some examples, an alternative route 308 indicator can be identified, generated, and/or output. The alternative route 308 indicator can be selectable for identifying one or more other customized paths (e.g., one or more alternative customized paths). The alternative customized paths can be identified in similar and/or different screen (e.g., a screen with one or more items having the same or different characteristics). The alternative customized path(s) can be associated with one or more alternative customized path characteristics, such as environmental conditions (e.g., one or more weather conditions), one or more schedule characteristics (e.g., days of the week, holidays, workdays, etc.), etc., or any combination thereof.

In some examples, one or more of the alternative customized path characteristic(s) can be automatically identified (e.g., identified by the position and mapping management system 102, as discussed above with reference to FIG. 1) and utilized by the user device 116 to output one or more alternative route indicators. In those or other examples, one or more of the alternative customized path characteristic(s) can be identified by one or more alternative customized path characteristic selections (e.g., text) received via user input. For example, in instances with one or more alternative customized path characteristic selections being received via user input, an alternative customized path characteristic (e.g., a weekend characteristic being utilized to identify a route for a weekend) can be identified based on the alternative customized path characteristic selection(s). The position and mapping management system 102 can identify whether to allow or reject the alternative customized path characteristic. The user device 116 can be controlled to allow the alternative path to be identified based on the alternative customized path characteristic being allowed.

Although the UI 200 is utilized to identify the customized position 204 indicator and the UI 300 screen is utilized to identify the customized path 302 as discussed above in the current disclosure, it is not limited as such. In some examples, one or more portions of the UI 200 screen can be integrated with one or more portions of the UI 300 screen. For example, with instances in which the customized position 204 indicator of the UI 200 screen is combined with the UI 300 screen, the customized position 204 indicator can be output on a stair, as shown in the UI 200 screen and at, and/or connected to, a portion (e.g., an end) of the customized path 302. In those or other examples, one or more portions of the UI 200 screen can be combined with one or more portions of the UI 300 screen into a different UI screen.

In some examples, the notification(s), such as a move closer 310 indicator, can include one or more user instructions. For example, the notification(s) can instruct the user to move the user device 116 to a different portion of the environment while generating the sensor data and/or identifying the customized path 302.

In some examples, the notification(s) can be utilized to indicate to the user, via the user device 116, that one or more deliveries by the customized path 302 may have an impact on a portion of the premises (e.g., the delivery(ies) may damage lawn based on a robot walking and/or rolling across the lawn, a parked vehicle in a driveway may result in the delivery(ies) being required to be performed by the robot walking and/or rolling across the lawn, etc.).

In some examples, one or more of the modification selection(s) can be received based on the notifications. In those or other examples, one or more accept selections being provided by user input to the user device 116 can be utilized by the user to continue identifying the customized position 204 indicator and/or the customized path 302, and/or to set the customized position 204 indicator and/or the customized path 302. In those or other examples, the notification(s) can be received based on the user selecting the package delivery location 204 indicator. The modification selection(s) and/or the accept selections can be received based on the notification(s) being output.

As a hypothetical example, an app of a user device can be utilized to receive user input for identifying a customized path, such as with the app being set in a customized path identification mode. In some cases, this mode can follow the customized position identification mode, so that any information from the customized position identification mode can be utilized to identify the customized path. For example, the customized position can be utilized to automatically identify an ending point of the path during and/or after selections being received from the user to generate the customized path.

In the hypothetical example, the user can take another video and make selections while the video is being taken. The user can utilize the user device and the app to select an indicator to start the video, and to select portions of a premises captured in the video as waypoints. The user can tap on a screen while the video is being taken, and augmented content, such as ellipses, squares, or any shapes, can be output on the screen during capturing of the video. The augmented content can be modified and/or the path can be set based on user input during capturing of the video or after the video is finished being captured. The augmented content can include lines (e.g., segments) connecting the waypoints, a line connected between a waypoint and a starting point of the customized path, and a line connected between a waypoint and an ending point of the customized path. The ending point can include a point on the customized position. The starting point, the ending point, and any other lines of the customized path can be formed and/or modified automatically to connect to the customized position (or manually based on selections by the user). The starting point, the ending point, and any other lines of the customized path can be formed and/or modified automatically (or manually based on selections by the user) to enable the customized path to be validated as a valid customized path.

In the hypothetical example, the user device and/or a service provider can utilize various types of sensor data to identify the customized path based on the input from the user. The sensor data can include camera data and lidar data, which can be fused to identify information about the premises as well as a portion of the premises that will be utilized as the customized path.

In the hypothetical example, the app can output indicators of the waypoints and the lines, respectively, with different characteristics based on whether metrics associated with the waypoints and the lines satisfy criteria. For example, a waypoint can be output in a red color if it is too close other items in the premises, and then the app can change the color of the waypoint to green based on the user dragging the waypoint to an acceptable location (such that a metric including a distance between the waypoint and another object on the premises is greater than or equal to a threshold metric, such as a threshold distance, or such that a metric including a firmness of surface under the waypoint, such as concrete, is greater than or equal to a threshold firmness, such as a threshold distance, after the user moves the waypoint from a location in grass to the concrete).

In the hypothetical example, the app can modify characteristics of the lines of the customized path in a similar way as for the waypoints. A line between waypoints or ends of the customized path can be output in a red color to inform the users that one or more types of customized path criteria associated with that line is not satisfied. The line can be changed from the red color to a green color, and vice versa (such as if the line is moved back to an invalid location) any number of times, as the user modifies a location of the line.

In the hypothetical example, the app can automatically output different types of lines as straight lines or curved lines (e.g., straight lines, curved lines, and/or natural lines conforming to surfaces, such as surfaces of the premises or items of the premises). The lines can be automatically output as the different types by the user device and/or automatically controlled by the service provider system. The app can possibly allow the user to change settings to control individual lines or all lines to be any of the different types. The app can possibly allow the user to drag any portion of any of the lines to different locations.

In the hypothetical example, the app can possibly have a mode that the user can select to "snap" portions of the lines or waypoints to locations that are valid. The app can possibly have a mode to "snap" any invalid portions of the lines or the waypoints to valid positions after the user finishing making selections used to identify the customized path. The app can possibly make suggestions, warnings, and/or instructions helping the user to modify the line, such as by being executed according to a notification and/or feedback mode (in combination with, or separate from, any other mode). For example, the app can output a notification informing the user that a portion of the path is crossing grass, or other sensitive terrain. The app can instruct the user to adjust that portion of the path and/or making suggestions on where to move the portion of the path (e.g., the app can instruct the user to slide the path to a pathway, a sideway, a staircase, a gravel area, etc.).

In the hypothetical example, the app can allow the user to set different routes, in a similar way as discussed above. A different screen can be utilized to set a different route based on the same video or a new video. Or, a single screen can include multiple routes, such as a route in one color for normal (e.g., sunny days) and a route in a different color for rainy days. The different colors can be used for different screens if different routes are shown on separate screens. Other characteristics can be used for different routes instead of colors, such as a "normal" route in bold and a "rainy day"

route being shown with thinner lines or dimmer lines, or with any combination of characteristics.

In the hypothetical example, the app can output various warnings, notifications, and/or instructions to guide the user. The app can instruct the user to reposition a waypoint that is highlighted, or to change a segment that is highlighted, to satisfactory locations of the premises. The app can instruct the user to move around the premises while taking the video to get generate sensor data that enables invalid customized paths to be modified to be valid customized paths. For example, if the user is standing too far from a portion of a yard depicted in the video, the sensor data may not be accurate enough to valid the customized path (or, similarly, for the customized position, as discussed above with reference to FIG. 2). The notifications can instruct the user to move closer to the portion of the yard, turn the mobile device to a side, or to change a vertical angle of the mobile device to capture a closer portion of the yard or a further portion of the yard, so that the identified customized path can be analyzed for validation.

In the hypothetical example, the user device and/or the service provider can identify whether the criteria is satisfied to validate the customized path. The service provider can utilize a machine learning (ML) model (e.g., an ML algorithm) to suggest the customized path and/or to modify a user identified customized path. The user can modify the customized path based on any ML model based identification and/or modification, in a similar way as for how identification and/or modifications are made by user input.

As another hypothetical example, the user may input the customized path, and the waypoints, and then select an indicator to set the path. If the customer tries to map directly across their lawn, the user device may be controlled to output a message, such as a pop-up with text including "this path requires the bot to walk (or roll) across your lawn, are you okay with this—Y/N." The user can select "Y" to accept this or "N" to make a modification to the path. The user device may display a pop-up with text including "do you want to disable this route on rainy days (we don't want to damage your lawn in any way)?—Y/N." The user can select "Y" to disable the route for rainy days. The user can select "N" to use the same route for rainy days. The user device may display, based on the route being disabled for rainy days, a pop-up with text including "would you like to create an alternative path?—Y/N." The user can select "Y" to create a new customized path for rainy days, or "N" to disable automated deliveries on rainy days, or, in some examples, now just revert back to still using the initial route as the default for rainy days.

As another hypothetical example, if the customer's front walkway passes through a driveway to get to the road, the user device can display a pop-up with text including "it looks like the route goes through your driveway, is a car typically parked in this location?—Y/N." The user can select "Y" to confirm that a car might be in the driveway, or "N" to indicate that it is not likely that a car will be parked there. The user device can display a pop-up with text including "if a car is parked here, are you okay with the bot briefly taking a path through your lawn to get around the vehicle?—Y/N." The user can select "Y" to enable a route through the lawn (e.g., which can be identified here, as well) if the car is parked in the driveway. The user can select "N" to disable automated deliveries if the car is parked in the driveway, or, in some examples, now just revert back to still using the initial route as the default for when the car is parked in the driveway.

In some examples, the UI 300 can include a back 312 indicator and a clear 314 indicator. In those or other examples, individual ones of the back 312 indicator and/or the clear 314 indicator can be implemented in a similar way as, or a different way from, the back 206 indicator and the clear 220 indicator, respectively.

In a hypothetical example, an app can be utilized to capture sensor data, such as camera data. The app can output one or more waypoints selected by a user, one or more waypoint automatically generated, one or more lines selected by a user, one or more lines automatically generated, and so on, or any combination thereof. A user can tap on a screen of a mobile device executing the app to set waypoints from an edge of a premises and to a delivery location. A customized path can be generated based on the waypoints, the lines, and starting and ending points. A customized position can be an end point. The edge of the premises can be the starting point, or other points on or off the premises at which a vehicle will begin travelling to the customized position after arriving at the premises.

In the hypothetical example, the starting point can be selected by the user manually or automatically identified by a user device or a service provider server. In such a case as the starting point being identified by a user, the user device and/or the service provider server can identify whether the starting point satisfies criteria, such as being at a correct location at which a vehicle will approach the premises. The app can be controlled to automatically modify the starting point, suggest a different starting point, provide descriptions of criteria, etc. The waypoints, the lines, the starting points, and/or any other information associated with the customized path can be identified by the user while taking the video, or afterward during video playback.

In the hypothetical example, the customized path can be validated based on customized path criteria, as discussed above with reference to FIG. 3. The customized path can be set based on a user selection received via user input. The set customized path selection can be received based on the user touching an indicator while taking a video or during playback of the video after the video is finished. The app can display various notifications, such as a notification that the customized path is valid, and/or that both the customized position and the customized path are valid. The notification that mapping is successful due to the customized position and the customized path being validated can enable the user to set the mapping (e.g., the customized position and the customized path). The valid customized position and the valid customized path can then be utilized to update a flag indicating that the user profile is eligible for automated deliveries.

In the hypothetical example, the customized path being validated, and the customized position being validated as discussed above with reference to FIG. 2, can be utilized to enable a user profile and/or automated delivery for a user, a user profile, and/or a user account. The user device and/or the service provider server can be utilized to analyze and/or modify any user identified customized position and/or customized path, and/or to identify whether the customized position is valid and/or whether the customized path is valid.

Figure 4:
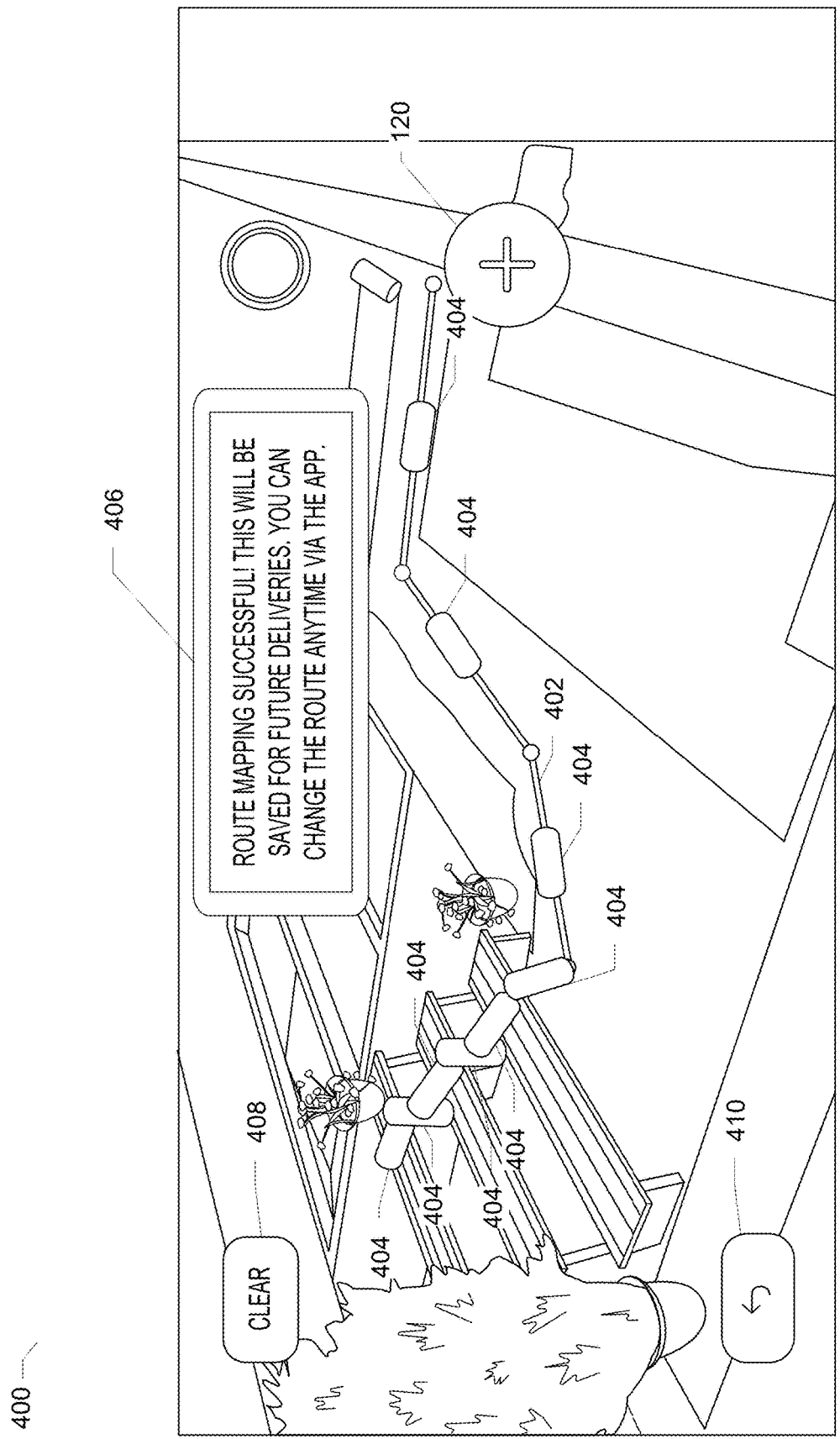
FIG. 4 is an illustrative user interface (UI) for a computing device utilized to receive selections via user input identifying a customized path as a validated path for customized path management.

FIG. 4 is an illustrative user interface (UI) 400 for a computing device utilized to receive selections via user input identifying a customized path as a validated path for customized path management. A UI 400 screen can be utilized to identify, generate, output, and/or modify one or more customized paths (e.g., the customized path(s) 120, as discussed above with reference to FIG. 1), such a customized path 402. In some examples, the customized path 402 can be identified, generated, output, and/or modified in a similar way as for the customize path 302.

In some examples, the customized path 402 can be a modified path based on the customized path 302. In those or other examples, one or more waypoints 404 can be identified based on the customized path 402, or vice versa. In those or other examples, the waypoint(s) 404 can include one or more of the waypoint(s) 304, as discussed above with respect to FIG. 3, and/or one or more other waypoints.

In some examples, one or more notifications, including a route mapping successful 406 indicator, can be identified and/or output. In those or other examples, the notification(s), which can include the route mapping successful 406 indicator, can be implemented in a similar way as the notifications discussed above with reference to FIG. 3. The route mapping successful 406 indicator can be output based on validation information, such as the validation information as discussed above with reference to FIG. 3. In some examples, the route mapping successful 406 indicator can be identified and/or output based on validation (e.g., via the user device 116 and/or the position and mapping management system 102) of the customized path 402 being successful.

In some examples, the validation being successful can be based on the customized position criteria being satisfied, the customized path criteria being satisfied, and/or validation of the customized path 402 including a portion (e.g., an end) at a beginning of a delivery area (e.g., a premises) and a portion (e.g., an end) at a delivery position (e.g., the customized position 202). In those or other examples, the validation being successful can be based on validation that the customized path 402 is validated as being usable for one or more item deliveries. In some examples, the validated path 402 can be received and determined by the position and mapping management system 102 as an enabled path, and/or determined by the user device 116 as the enabled path.

In some examples, the customized path 402 being determined as a validated customized path can be received and determined by the position and mapping management system 102 as an enabled path. Additionally or alternatively, the validated customized path 302 can be determined by the user device 116 as the enabled path.

In some examples, the UI 400 can include a back 410 indicator and a clear 408 indicator. In those or other examples, individual ones of the back 410 indicator and/or the clear 408 indicator can be implemented in a similar way as, or a different way from, the back 312 indicator and the clear 314 indicator, respectively.

Figure 5A:
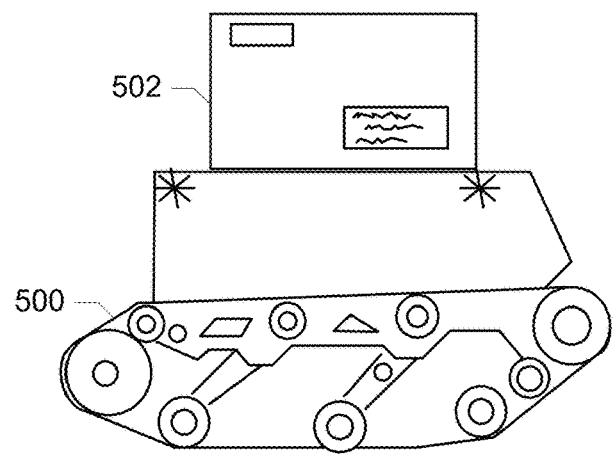
FIGS. 5A-5C are illustrative delivery vehicles for item delivery management.
Figure 5B:
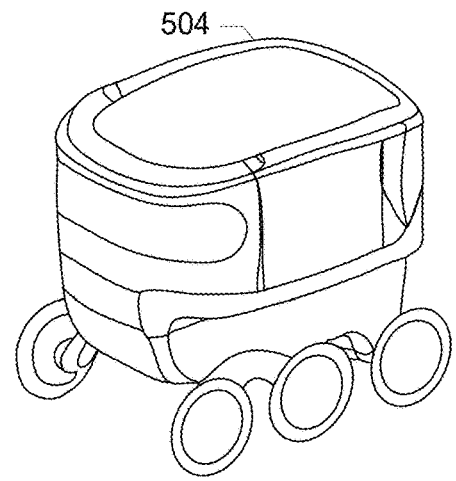
Figure 5C:
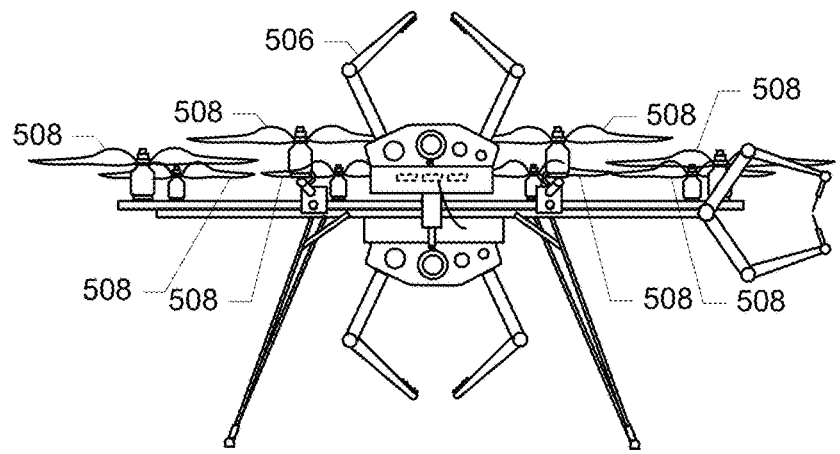

FIGS. 5A-5C are illustrative delivery vehicles for item delivery management. As illustrated in FIG. 5A, a vehicle 500 can include wheels and/or a wheel belt usable for the vehicle 500 to traverse an environment (e.g., any of the premises as discussed above with respect to FIG. 1. The vehicle 500 can be utilized to deliver one or more items, such as an item 502, to one or more customized positions (e.g., any of the customized position(s) 118) by traverse the environment along one or more customized paths (e.g., any of the customized path(s) 120). In some examples, the vehicle 500 can deliver the item by utilizing one or more levers, one or more hinges, one or more springs, one or more belts, one or more hydraulics, etc., to move (e.g., project, slide, etc., or any combination thereof) the item 502 to the customized position 118. The vehicle 500 can traverse along the customized path to a portion near (e.g., in front of) the customized position 118, and then move the item 502 to be placed at the customized position 118.

In some examples, the vehicle 500 can be controlled based on one or more communications received from one or more processors of the vehicle 500, the position and mapping management system 102, the user device 116, and/or one or more other computing devices. In those or other examples, the vehicle 500 can be an autonomous or a semi-autonomous vehicle.

As illustrated in FIG. 5B, a vehicle 504 can include wheels usable for the vehicle 504 to traverse an environment (e.g., any of the premises as discussed above with respect to FIG. 1. The vehicle 504 can be utilized to deliver one or more items, such as an item within the vehicle 504, to one or more customized positions (e.g., any of the customized position(s) 118) by traversing the environment along one or more customized paths (e.g., any of the customized path(s) 120). In some examples, the vehicle 504 can deliver the item by utilizing one or more levers, one or more hinges, one or more springs, one or more belts, one or more hydraulics, etc., to move (e.g., project, slide, etc., or any combination thereof) the item to the customized position 118. The vehicle 504 can traverse along the customized path to a portion near (e.g., in front of) the customized position 118, and then move the item to be placed at the customized position 118.

In some examples, the vehicle 504 can be controlled based on one or more communications received from one or more processors of the vehicle 504, the position and mapping management system 102, the user device 116, and/or one or more other computing devices. In those or other examples, the vehicle 504 can be an autonomous or a semi-autonomous vehicle.

As illustrated in FIG. 5C, a vehicle (e.g., an unmanned aerial vehicle (UAV)) 506 can include one or more propellers 508 usable for the vehicle 506 to traverse an environment (e.g., any of the premises as discussed above with respect to FIG. 1). In some examples, the vehicle 506 can include a single rotor 508 like a helicopter, or wings and a propeller, like a plane, depending on the mission and flight area. The vehicle 506 can be utilized to deliver one or more items, such as an item within, and/or held by, the vehicle 506, to one or more customized positions (e.g., any of the customized position(s) 118) by traverse the environment along one or more customized paths (e.g., any of the customized path(s) 120). In some examples, the vehicle 506 can deliver the item by utilizing one or more levers, one or more hinges, one or more springs, one or more belts, one or more hydraulics, etc., to move (e.g., project, slide, etc., or any combination thereof) the item to the customized position 118. The vehicle 506 can traverse along the customized path to a portion near (e.g., in front of) the customized position 118, and then move the item to be placed at the customized position 118.

In some examples, the vehicle 506 can be controlled based on one or more communications received from one or more processors of the vehicle 506, the position and mapping management system 102, the user device 116, and/or one or more other computing devices. In those or other examples, the vehicle 506 can be an autonomous or a semiautonomous vehicle.

Although the vehicle 500, the vehicle 504, and/or the vehicle 506 can be utilized to deliver one or more items, as discussed above in the current disclosure, it is not limited as such. In some examples, one or more other vehicles, one or more robots, etc., can be utilized, alternatively or in addition to, vehicle 500, the vehicle 504, and/or the vehicle 506 to deliver the item(s). In those or other examples, the vehicle(s) and/or the robot(s) can include one or more legs, one or more automated and/or robotic arms, etc., one or more wheels of different sizes, made of various types of materials, which in some cases, enable the vehicle(s) and/or the robot(s) to traverse, with various levels of success, one or more portions (e.g., stairs, grass, water, rocks, trees, roots, etc.) of the premises.

Although the vehicles 500, 504, and/or 506 can be utilized to deliver items utilizing the customized position 118 and/or the customized path 120 as discussed above in the current disclosure, it is not limited as such. In some examples, one or more modifications, such as one or more modifications based on validation information and/or confirmation information, as discussed above with reference to FIG. 1, can be utilized to modify the customized position 118 and/or the customized path 120 before, during, and/or after delivery of an item is being performed by the vehicles 500, 504, and/or 506.

FIG. 6 is a block diagram of an illustrative computing architecture 600 of one or more computing devices shown in FIG. 1. The computing architecture 600 may include a composite storefront image management system 602 (e.g., a composite virtual storefront image management system), which can include one or more content servers 604 associated with a service provider 606. The content server(s) 604 may be included in, and utilized to implement any functions of, the position and mapping management system 102 shown in FIG. 1.

The computing architecture 600 may include one or more third-party content servers 608, which may be associated with a third-party service provider 610. The third-party content server(s) 608 may be included in, and utilized to implement any functions of, one or more third-party server(s) as discussed throughout this disclosure.

The computing architecture 600 may include one or more user devices 612. The user devices 612 may be included in, and utilized to implement any functions of, one or more user devices (e.g., user device(s) 116 shown in FIG. 1) as discussed throughout this disclosure.

The content server(s) 604, and the third-party content server(s) 608, and/or the user device(s) 612 may be configured to communicate with one another via one or more networks 614. The user device(s) 612 may communicate with the content server(s) 604 and the third-party content server(s) 608, such as to transmit requests to, and receive responses from, the content server(s) 604 and the third-party content server(s) 608. The user device(s) 612 may transmit any information associated with the requests to, and receive any information associated with the responses from, the content server(s) 604 and the third-party content server(s) 608. The user device(s) 612 may communicate between one another utilizing the network(s) 614. The content server(s) 604 may transmit any information associated with the requests to, and receive any information associated with the responses from, the third-party content server(s) 608. The third-party content server(s) 608 may transmit any information associated with the requests to, and receive any information associated with the responses from, the content server(s) 604.

The network(s) 614 may include the Internet, cable networks, cellular networks, wireless networks (e.g., Wi-Fi) and/or wired networks, as well as close-range communications such as Bluetooth®, Bluetooth® low energy, or the like. The content server(s) 604, and the third-party content server(s) 608, and/or the user device(s) 612 may communicate among one another utilizing the same type, or different types, of networks (e.g., networks with different protocols). The network(s) 614 may include the Internet, cable networks, cellular networks, wireless networks (e.g., Wi-Fi) and/or wired networks, as well as close-range communications such as Bluetooth®, Bluetooth® low energy, or the like).

The user device(s) 612 may represent, but are not limited to, televisions (TVs), cellular telephones, desktop computers, server computers or blade servers such as web-servers, map-reduce servers, or other computation engines or network-attached storage units, personal computers, mobile computers, laptop computers, tablet computers, telecommunication devices, network-enabled televisions, thin clients, terminals, personal data assistants (PDAs), game consoles, gaming devices, work stations, media players, personal video recorders (PVRs), set-top boxes, cameras, integrated components for inclusion in a computing device, appliances, voice-enabled device(s), or any other sort of computing device coverable of sending communications and performing the functions according to the techniques described herein. Among these TVs are liquid crystal display (LCD) TVs, light emitting diode (LED) TVs, organic light emitting diode (OLED) TVs, plasma display devices (PDP) TVs, quantum dot (QLED) TVs, and electroluminescent (ELD) TVs. In some examples, the voice-enabled device(s) of the user device(s) 612 may include devices with or without display components. In some examples, the display device(s) of the user device(s) 612 may include devices with or without speech processing components.

In the illustrated example, the content server(s) 604, and the third-party content server(s) 608, and/or the user device(s) 612 include one or more processors 616(1), 616(2), and/or 616(3) (collectively processor(s) 616), at least one memory 618(1), 618(2), and/or 618(3) (collectively memory 618), one or more input/output (I/O) interfaces 620(1), 620(2), and/or 620(3) (collectively I/O interface(s) 620), and/or one or more communication (e.g., network) interfaces 622(1), 622(2), and/or 622(3) (collectively communication interface(s) 622). The user device(s) 612 may include one or more display interfaces 624. In some examples, one or more of the voice-controlled device(s) among the user device(s) 612 are controlled only by voice and do not include any display interface.

Each processor 616 may include multiple processors and/or a processor having multiple cores. Further, the processor(s) 616 may include one or more cores of different types. For example, the processor(s) 616 may include application processor units, graphic processing units, and so forth. In various examples, the processor(s) 616 may include one or more microprocessors, microcomputers, microcontrollers, digital signal processors, central processing units, state machines, logic circuitries, and/or any devices that manipulate signals based on operational instructions. In some examples, the processor(s) 616 may include one or more hardware processors and/or logic circuits of any suitable type specifically programmed or configured to execute the algorithms and processes described herein.

For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 616 may possess its own local memory, which also may store program components, program data, and/or one or more operating systems.

In some examples, the processor(s) 616 may be configured to fetch and execute computer-readable processor-executable instructions stored in the memory 618. Depending on the configuration of the content server(s) 604, and the third-party content server(s) 608, and/or the user device(s) 612, the memory 618 may be an example of tangible non-transitory computer storage media and may include volatile and nonvolatile memory and/or removable and nonremovable media implemented in any type of technology for storage of information such as computer-readable processor-executable instructions, data structures, program modules or other data. Such memory 618 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory 618 may be implemented as computer-readable storage media ("CRSM"), which may be any available physical media accessible by the processor(s) 616 to execute instructions stored on the memory 618. In some examples, CRSM may include random-access memory ("RAM") and Flash memory. In other examples, CRSM may include, but is not limited to, read-only memory ("ROM"), electrically erasable programmable read-only memory ("EEPROM"), or any other tangible medium which may be used to store the desired information, and which may be accessed by the processor(s) 616.

The memory 618 may be used to store and maintain any number of functional components that are executable by the processor 616. In some examples, these functional components include instructions or programs that are executable by the processor 616 and that, when executed, implement operational logic for performing the actions and services attributed above to the content server(s) 604, and the third-party content server(s) 608, and/or the user device(s) 612. Functional components of the content server(s) 604, and the third-party content server(s) 608, and/or the user device(s) 612 stored in the memory 618(1), 618(2), and/or 618(3) may include applications 626(1), 626(2), and/or 626(3) (collectively applications 626). The application(s) 626 may configure the respective devices to perform functions described herein such as with regard to FIGS. 1-5 and 7.

The functional components of the content server(s) 604, and the third-party content server(s) 608, and/or the user device(s) 612 stored in the memory 618(1), 618(2), and/or 618(3) may additionally include operating systems 628(1), 628(2), and/or 628(3), respectively (collectively operating systems 628). The operating system(s) 628 for controlling and managing various functions of the content server(s) 604, and the third-party content server(s) 608, and/or the user device(s) 612. The memory 618 may also store other modules and data, which may include programs, drivers, etc., and the data used or generated by the functional components, to enable efficient and effective food order processing. Further, the content server(s) 604, and the third-party content server(s) 608, and/or the user device(s) 612 may include many other logical, programmatic and physical components, of which those described are merely examples that are related to the discussion herein. In addition, the memory 618 may also store data, data structures and the like, that are used by the functional components.

The I/O interface(s) 620, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 622 may include one or more interfaces and hardware components for enabling communication with various other devices over the network or directly.

Although the terms "user" and "operator" are used for simplicity and/or clarity throughout the current disclosure, it is not limited as such. In some examples, any of the terms including "user" and "operator" can be utilized interchangeably, and/or interpreted in a similar way, with respect to any of the techniques discussed herein.

Figure 7:
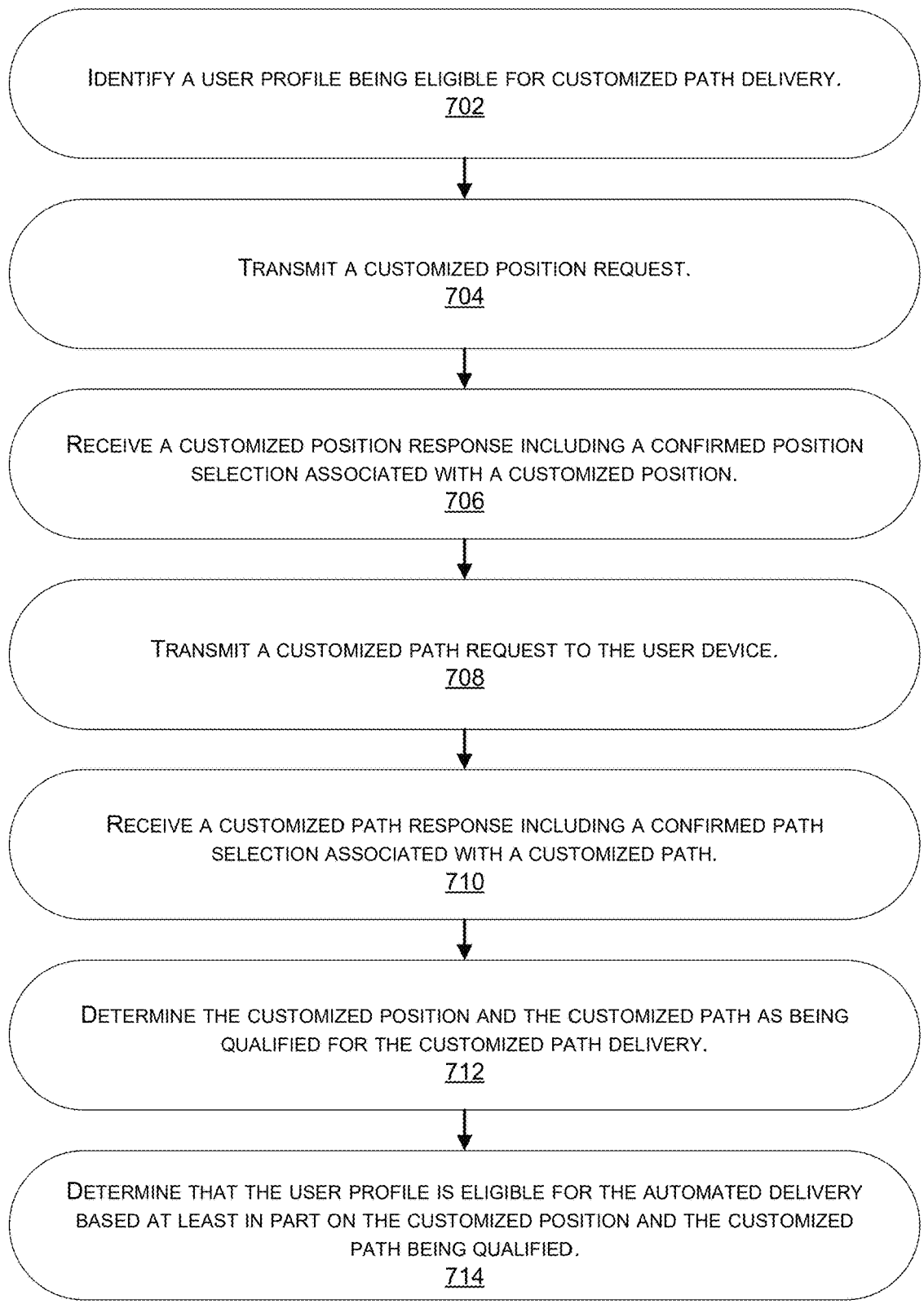
FIG. 7 is a flow diagram of an illustrative process for position and mapping management.

FIG. 7 is a flow diagram of an illustrative process 700 for position and mapping management.

At 702, the process 700 can include identifying a user profile being eligible for automated delivery. The user profile can be identified based at least in part on a location identified in the user profile.

At 704, the process 700 can include transmitting a customized position request. The customized position request can be transmitted to a user device of a user associated with the user profile.

At 706, the process 700 can include receiving a customized position response including a confirmed position selection associated with a customized position 118. The customized position response including the confirmed position selection associated with the customized position 118 for the automated delivery can be received from the user device 116. The customized position 118 can be identified based at least in part on a first portion of sensor data generated by at least one of a lidar sensor or a camera sensor of the user device 116.

At 708, the process 700 can include transmitting a customized path request to the user device 116.

At 710, the process 700 can include receiving a customized path response including a confirmed path selection associated with a customized path 120. The customized path response including the confirmed path selection associated with the customized path 120 for the automated delivery can be received from the user device 116. The customized path 120 can be identified based at least in part on a second portion of the sensor data.

At 712, the process 700 can include determining the customized position 118 and the customized path 120 as being qualified for the automated delivery. The customized position 118 and the customized path 120 as being qualified can be determined as being qualified based at least in part on at least one of a position characteristic criteria or a path characteristic criteria.

In some examples, the customized position 118 and/or the customized path 120 can be qualified based on validation data utilized to determine whether the delivery via the customized position 118 and/or the customized path 120 would overlap with portions of the premises, such as grass, etc. The validation data can be utilized to output notifications on the user device 116 and to receive an acceptance selection or a modification of the customized position 118 and/or the customized path 120. The acceptance or the modification can be identified and utilized to determine the customized position 118 and/or the customized path 120 are to be qualified, prior to qualifying the customized position 118 and/or the customized path 120. For example, a notification can state "This route is through your grass, would you like to continue, modify, or create a separate route for rainy weather."

At 714, the process 700 can include determining that the user profile is eligible for the automated delivery based at least in part on the customized position and the customized path 120 being qualified.

Although the term "user" is utilized throughout this disclosure, it is not limited as such and the term "user" is utilized for simplicity. The term "user" as used throughout disclosure may denote any type of user, including a user, an administrator, an operator, a customer, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
   at least one processor; and
   at least one non-transitory computer-readable storage medium having computer-executable instructions stored thereon which, when executed by the at least one processor, cause the at least one processor to perform operations comprising:
   presenting, via a user device of a user associated with a user profile, a customized position request that solicits an identification of one or more customized positions at a physical location at which items are to be delivered by one or more bots controlled by one or more servers of a service provider, wherein the user device is a separate device from the one or more bots;
   receiving, from the user device, a customized position response including a customized position being identified by a customized position selection, received via first user input to the user device via a first image depicting the physical location, the customized position being usable for item placement associated with customized path delivery of an item by a bot transporting the item;
   determining, based on first analysis of the first image and location data previously stored in association with the physical location, a first lack of first objects or first obstacles preventing the bot from transporting the item from a delivery vehicle to the customized position;
   identifying the customized position as is a valid position to deliver the one or more items based on a first initial user assessment of a first quality metric, a first accuracy metric, and a first feasibility metric associated with a position characteristic associated with the customized position for placement of the item by the bot based on the first lack of the first objects or the first obstacles;
   transmitting a customized path request to the user device prompting the user to designate a pathway to the customized position;
   receiving, from the user device and via the first image or a second image depicting the physical location, a customized path response including a customized path being identified by a customized path selection received via second user input to the user device, the customized path selection being associated with a portion of sensor data generated by at least one of a lidar sensor or a camera sensor of the user device, the customized path being usable for bot movement associated with the customized path delivery of the item by the bot;
   utilizing object recognition to generate a map of the physical location and to identify one or more features associated with the physical location;
   storing the map and the one or more features in association with the user profile and the physical location;
   determining, based on second analysis of the first image or the second image and the location data, a second lack of second objects or second obstacles preventing the bot from transporting the item along the customized path to the customized position;
   identifying the customized path as being preliminarily qualified for the customized path delivery based on a second initial user assessment of a second quality metric, a second accuracy metric, and a second feasibility metric associated with a path characteristic associated with the customized path used by the bot for the customized path delivery of the item based on the second lack of the second objects or the second obstacles;
   identifying the customized position and the customized path being qualified for the customized path delivery based on at least one confirmation selection of at least one of the position characteristic or the path characteristic, the at least one confirmation selection being received via third user input to at least one of the user device
   determining that the user profile is deemed activated for the customized path delivery based on the customized position and the customized path being qualified;
   storing the customized path delivery, the customized position, and the customized path in association with user profile and the physical location; and
   utilizing the customized path delivery for future delivery of items to the physical location.

2. The system of claim 1, wherein:
   the at least one confirmation selection includes a first confirmation selection, and the customized position is identified based on an application executing on the user device, the application being utilized to process the first confirmation selection,
   the application is utilized to:
   identify a modified customized position selection received via fourth user input to the user device,
   display the customized position as a validated representative image, and
   identify a second confirmation selection of the customized position displayed as the validated representative image, and
   identifying the customized position as being qualified includes identifying the customized position as being qualified for the customized path delivery based on the second confirmation selection.

3. The system of claim 1, wherein:
   the customized position is identified based on an application executing on the user device, the application being utilized to process the customized position selection, and
   the application is utilized to:
   display the customized position as a representative image,
   display a notification indicating the customized position as being a non-enabled customized position, and
   identify a feedback selection received via fourth user input to the user device, the feedback selection being utilized by the user to provide feedback associated with the non-enabled customized position.

4. The system of claim 1, wherein:
the sensor data includes video data and lidar data, and
the customized path selection is:
- received by the user device based on an application of the user device being utilized to record the video data and the lidar data based on the user moving the user device to direct the lidar sensor and the camera sensor, and
- identified by at least one waypoint selected by the user, the at least one waypoint being selected by at least one waypoint selection received via fourth user input to the user device during generation of the video data and the lidar data.

5. The system of claim 1, wherein:
the sensor data includes video data and lidar data, the customized path selection includes screen taps received via fourth user input to the user device during generation of the video data and the lidar data by the user, and the screen taps are utilized to identify a first waypoint and a second waypoint,
at least a portion of the customized path extends between the first waypoint and the second waypoint, and
the customized path is utilized to control the bot to traverse at least a portion of a premises associated with the user to deliver the item.

6. A system comprising:
at least one processor; and
at least one non-transitory computer-readable storage medium having computer-executable instructions stored thereon which, when executed by the at least one processor, cause the at least one processor to perform operations comprising:
- transmitting a customized position request to a user device of a user associated with a user profile, the customized position request requesting identification of one or more customized positions at a physical location, associated with the user profile, at which one or more items are to be delivered by one or more bots that transport the one or more items;
- receiving, from the user device, a customized position response including a confirmed position selection associated with a customized position for customized path delivery, based at least in part on sensor data generated by the user device and depicting one or more images of the physical location;
- transmitting a customized path request to the user device prompting the user to designate a pathway to the customized position;
- receiving, from the user device, a customized path response including a confirmed path selection associated with a customized path for the customized path delivery, based at least in part on the sensor data;
- determining, based on analysis of the one or more images, a lack of objects or obstacles preventing a bot of the one or more bots from transporting an item of the one or more items to the customized position along the customized path;
- determining the customized position and the customized path as being qualified for the customized path delivery based at least in part on at least one of the customized position or the customized path and the lack of the objects or the obstacles; and
- determining that the user profile is eligible for customized path delivery based at least in part on the customized position and the customized path being qualified.

7. The system of claim 6, the operations further comprising:
- determining a position characteristic metric associated with a position characteristic of the customized position;
- determining the customized position is a valid position to deliver the one or more items based at least in part on a position characteristic criteria being satisfied by the position characteristic metric being less than or equal to a position characteristic metric threshold, wherein the position characteristic comprises at least one of: an amount of space at the customized position or a flatness or robustness of a surface at the customized position,
- wherein transmitting the customized path request further comprises transmitting the customized path request based at least in part on the customized position being a valid position for the customized path delivery.

8. The system of claim 6, the operations further comprising:
- determining a path characteristic metric associated with a path characteristic of the customized path;
- determining the customized path as being preliminarily qualified for the customized path delivery based at least in part on a path characteristic criteria being satisfied by the path characteristic metric being less than or equal to a path characteristic metric threshold,
- wherein determining the customized position and the customized path as being qualified further comprises determining the customized position and the customized path as being qualified based at least in part on the customized path being preliminarily qualified.

9. The system of claim 6, the operations further comprising:
- determining the customized position and the customized path as being preliminarily qualified;
- determining at least one flagged characteristic including at least one of a position characteristic or a path characteristic being flagged, based at least in part on the at least one of the position characteristic or the path characteristic not satisfying at least one customized path delivery characteristic criteria; and
- determining at least one modified characteristic replacing the at least one flagged characteristic, based at least in part on a modification selection received via user input to the user device,
- wherein the user profile is determined to be eligible for the customized path delivery based at least in part on the at least one modified characteristic.

10. The system of claim 6, wherein:
the customized position is identified by a customized position selection received via first user input to the user device, and
the customized path is identified by a customized path selection received via second user input to the user device.

11. The system of claim 6, wherein:
the customized position is identified by a customized position selection via a first machine learning (ML) algorithm, and
the customized path is identified by a customized path selection received via a second ML algorithm.

12. The system of claim 6, wherein the customized position is determined by a customized position selection via a machine learning (ML) algorithm, the ML algorithm being previously trained utilizing at least one training customized position identified by at least one training customized position selection received via at least one training user input to at least one training user device.

13. The system of claim 6, wherein the customized path is determined by a customized path selection via a machine learning (ML) algorithm, the ML algorithm being previously trained utilizing at least one training path position identified by at least one training customized path selection received via at least one training user input to at least one training user device.

14. The system of claim 6, wherein:
the customized position is determined by a customized position selection via a machine learning (ML) algorithm, and
receiving the customized position response further comprises: receiving a first message including the sensor data; generating the customized position via the ML algorithm;
transmitting a second message including the customized position generated via the ML algorithm; and
receiving the customized position response including the confirmed position selection as a confirmation of the customized position generated via the ML algorithm, the confirmed position selection being received via user input to the user device.

15. The system of claim 6, wherein:
the customized path is determined by a customized path selection via a machine learning (ML) algorithm, and
receiving the customized path response further comprises: receiving a sensor data message including the sensor data; generating the customized path via the ML algorithm;
transmitting a customized path message including the customized path generated via the ML algorithm; and
receiving the customized path response including the confirmed path selection as a confirmation of the customized path generated via the ML algorithm, the confirmed path selection being received via user input to the user device.

16. A method comprising:
transmitting a customized position request to a user device of a user associated with a user profile, the customized position request requesting identification of one or more customized positions at a physical location, associated with the user profile, at which one or more items are to be delivered by one or more bots that transport the one or more items;
receiving, from the user device, a customized position response including a customized position being identified by a customized position selection received via first user input by utilizing an application being executed by the user device and presenting one or more images of the physical location,
transmitting a customized path request to the user device prompting the user to designate a pathway to the customized position;
receiving, from the user device, a customized path response including a customized path being identified by a customized path selection received via second user input to the user device;
determining, based on analysis of the one or more images, a lack of objects or obstacles preventing a bot of the one or more bots from transporting an item of the one or more items to the customized position along the customized path;
determining the customized position and the customized path as being qualified for customized path delivery based on at least one of the customized position or the customized path and the lack of the objects or the obstacles; and
determining that the user profile is deemed activated for the customized path delivery based at least in part on the customized position and the customized path being qualified.

17. The method of claim 16, further comprising:
determining a position characteristic criteria as being satisfied by a position characteristic metric associated with a position characteristic of the customized position;
determining a path characteristic criteria as being satisfied by a path characteristic metric associated with a path characteristic of the customized path;
wherein determining the customized position and the customized path as being qualified further comprises determining the customized position and the customized path as being a qualified request based at least in part on the position characteristic criteria and the path characteristic criteria being satisfied.

18. The method of claim 16, wherein:
the customized path is identified by a first waypoint selection and a second waypoint selection received via third and fourth user inputs to the user device;
the first waypoint selection is associated with a first waypoint, and the second waypoint selection is associated with a second waypoint; and
the first waypoint and the second waypoint are utilized to identify at least a portion of the customized path extending between the first waypoint and the second waypoint.

19. The method of claim 16, further comprising:
determining the customized position and the customized path as being preliminarily qualified; and
determining at least one flagged characteristic including at least one of a position characteristic or a path characteristic being flagged, based on the at least one of the position characteristic or the path characteristic not satisfying at least one customized path delivery characteristic criteria; and
determining at least one modified characteristic replacing the at least one flagged characteristic, based at least in part on a modification selection received via user input to the user device, and
wherein the user profile is deemed active for customized path delivery based on the at least one modified characteristic.

20. The method of claim 16, wherein:
the application is utilized to display the customized position as an unvalidated representative image, identify at least one modified customized position selection, display the customized position as a validated representative image, and determine the customized position displayed as the validated representative image as being a preliminarily qualified customized position, and transmit the customized position response based at least in part on the customized position being determined as the preliminarily qualified customized position; and
transmitting the customized path request comprises transmitting the customized path request based at least in part on the customized position being determined as the preliminarily qualified customized position.

* * * * *